United States Patent [19]
Miner et al.

[11] Patent Number: 5,652,789
[45] Date of Patent: Jul. 29, 1997

[54] NETWORK BASED KNOWLEDGEABLE ASSISTANT

[75] Inventors: Richard A. Miner, Cambridge; William J. Warner, Weston; Anthony M. Lovell, Somerville; Eric R. Shienbrood, Concord; Keith Gabryelski, Cambridge; Kenneth C. R. C. Arnold, Lexington; Nicholas C. d'Arbeloff, Belmont; Kee Hinckley, Winchester, all of Mass.

[73] Assignee: Wildfire Communications, Inc., Lexington, Mass.

[21] Appl. No.: 316,635

[22] Filed: Sep. 30, 1994

[51] Int. Cl.⁶ .................................................. H04M 3/42
[52] U.S. Cl. ........................ 379/201; 379/88; 379/202
[58] Field of Search .................................. 379/201, 202, 379/203, 206, 211, 212, 213, 214, 67, 88, 89

[56] References Cited

U.S. PATENT DOCUMENTS

| | | | |
|---|---|---|---|
| 4,313,035 | 1/1982 | Jordan et al. | 379/207 |
| 4,585,906 | 4/1986 | Matthews et al. | 379/88 |
| 4,761,807 | 8/1988 | Matthews et al. | 379/89 |
| 4,873,719 | 10/1989 | Reese | 379/215 |
| 4,933,966 | 6/1990 | Hird et al. | 379/132 |
| 4,953,204 | 8/1990 | Cuschleg, Jr. et al. | 379/266 |
| 4,972,462 | 11/1990 | Shibata | 379/89 |
| 5,131,024 | 7/1992 | Pugh et al. | 379/67 |
| 5,195,086 | 3/1993 | Baumgartner et al. | 379/202 X |
| 5,243,645 | 9/1993 | Bissell et al. | 379/211 |
| 5,263,084 | 11/1993 | Chaput et al. | 379/215 |
| 5,327,486 | 7/1994 | Wolff et al. | 379/96 |
| 5,329,578 | 7/1994 | Brennan et al. | 379/67 |
| 5,333,266 | 7/1994 | Boaz et al. | 395/200 |
| 5,355,403 | 10/1994 | Richardson, Jr. et al. | 379/88 |
| 5,384,771 | 1/1995 | Isidoro et al. | 370/58.2 |
| 5,408,526 | 4/1995 | McFarland et al. | 379/202 |
| 5,414,754 | 5/1995 | Pugh et al. | 379/67 |
| 5,436,963 | 7/1995 | Fitzpatrick et al. | 379/212 |
| 5,463,684 | 10/1995 | Morduch et al. | 379/202 |
| 5,566,236 | 10/1996 | MeLampy et al. | 379/201 |

OTHER PUBLICATIONS

Article entitled "WordPerfect: New Telephony Features Boost Office", WordPerfect Office Techbrief, 1994 Info-World Publishing Company, vol. 10, Issue 2, pp. 2–3.

Schmandt et al., "Phone Slave: A Graphical Telecommunications Interface", Proceedings of the SID, vol. 26/1, 1985 pp. 79–82.

Schmandt et al., "A Conversational Telephone Messaging System", IEEE Transactions on Consumer Electronics, Aug. 1984, vol. CE–30, No. 3, pp. xxi–xxiv.

Article by Chris Schmandt entitled, "Phoneshell: the Telephone as Computer Terminal" pp. 373–382, Proceedings of ACM Multimedia '93 Conference, 1993.

(List continued on next page.)

*Primary Examiner*—Krista M. Zele
*Assistant Examiner*—Scott L. Weaver
*Attorney, Agent, or Firm*—Fish & Richardson P.C.

[57] ABSTRACT

A method implemented by a computer-based electronic assistant to receive and manage incoming calls to a subscriber including the steps of receiving an incoming call to the subscriber from a caller; establishing a first connection between the electronic assistant and the caller; establishing a second connection between the electronic assistant and the subscriber; over the second connection, electronically notifying the subscriber of the incoming call; in response to receiving a call accept command from the subscriber over the second connection, linking the caller and the subscriber so that they may communicate with each other; upon linking the subscriber to the caller, switching the electronic assistant to a background mode in which said electronic assistant continues to monitor the subscriber over the second connection while the subscriber is linked with the caller; and in response to receiving a summoning command, switching the electronic assistant into a foreground mode, wherein the electronic assistant when in its background mode responds to a first set of commands including at least the summoning command and when in its foreground mode responds to a second set of commands where the second set of commands is larger than the first set of commands.

4 Claims, 24 Drawing Sheets

OTHER PUBLICATIONS

Brochure from Bellcore Technology Licensing entitled "The Electronic Receptionist—A Knolwedge–Based Approach to Personal Communications" pp. 1–8 (1994).

Article by Eric Thich Vi Ly entitled, "Chatter: A Conversational Telephone Agent" submitted to Program in Media Arts and Sciences, at the Massachusetts Institute of Technology, Jun. 1993, pp. 1–130.

Copy of International PCT Report dated Mar. 20, 1996.

Schmandt et al., "A Conversational Telephone Messaging System," *Consumer Electronics*, 30 (1984).

Schmandt, "Phoneshell: the Telephone as Computer Terminal," *ACM Multimedia*, 373–382 (1993).

"WordPerfect Office Telephone Access Server," *WordPerfect Office Techbrief*, 10:1–3 (1994).

"The Electronic Receptionist, A Knowledge–Based Approach to Personal Communications," *Bellcore*, 1–8 (1994).

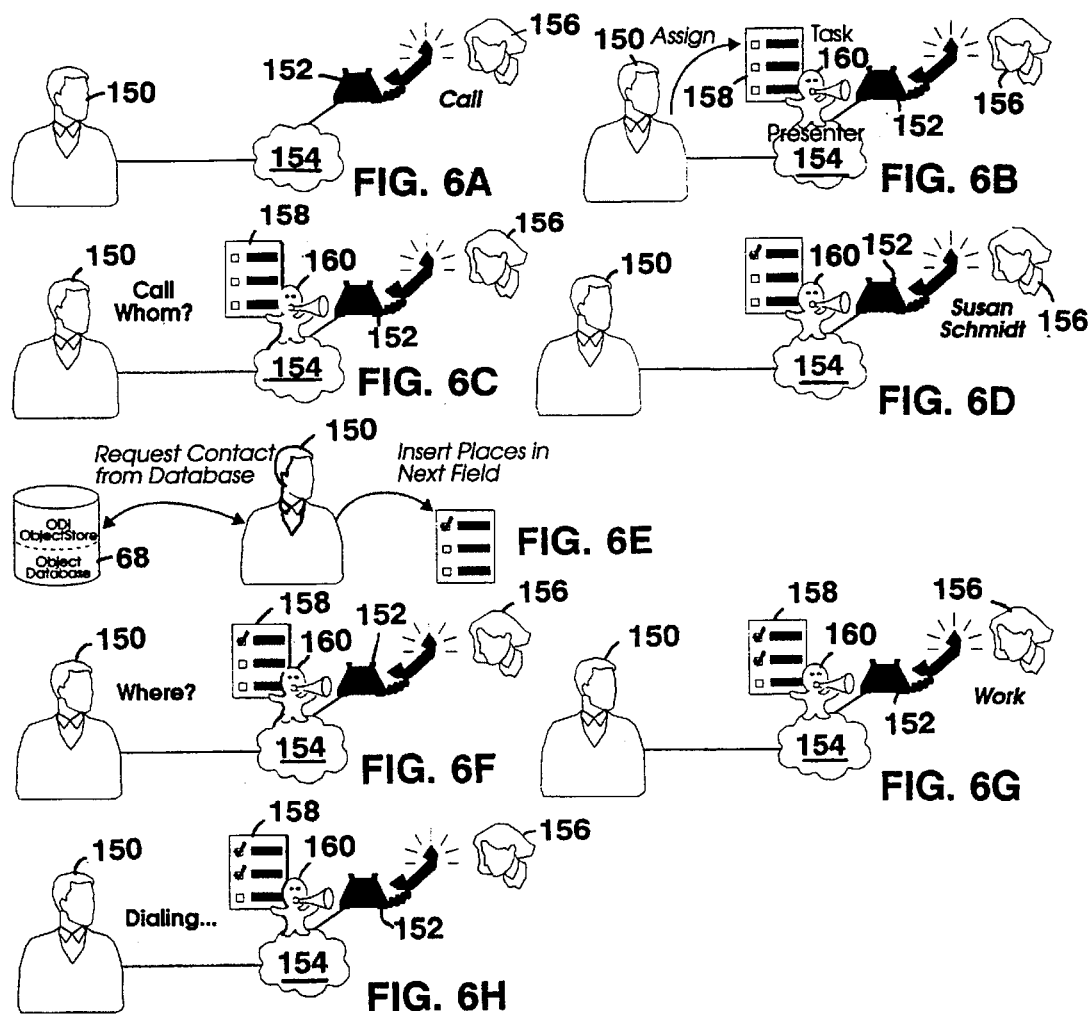

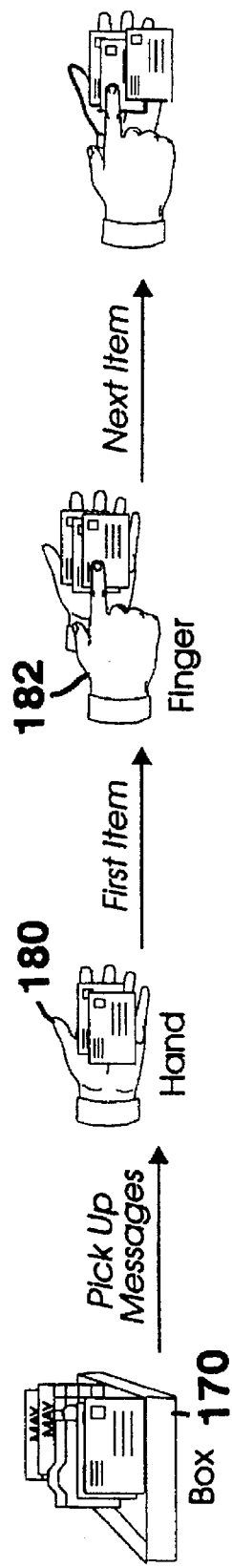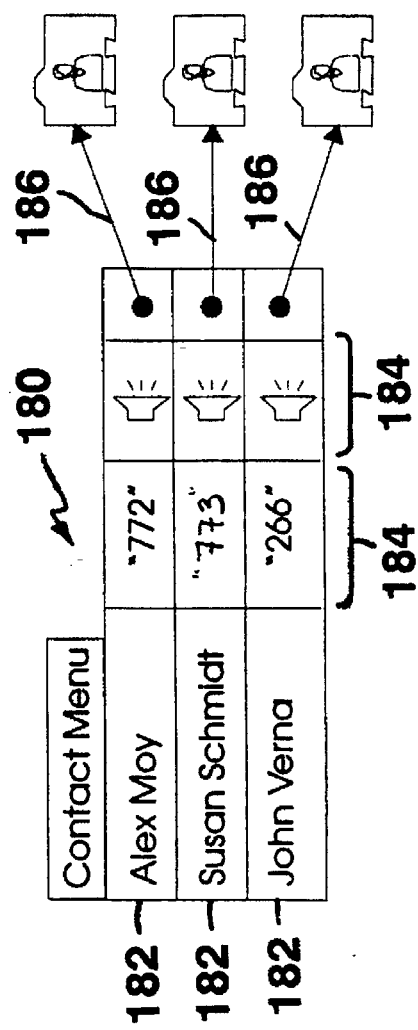

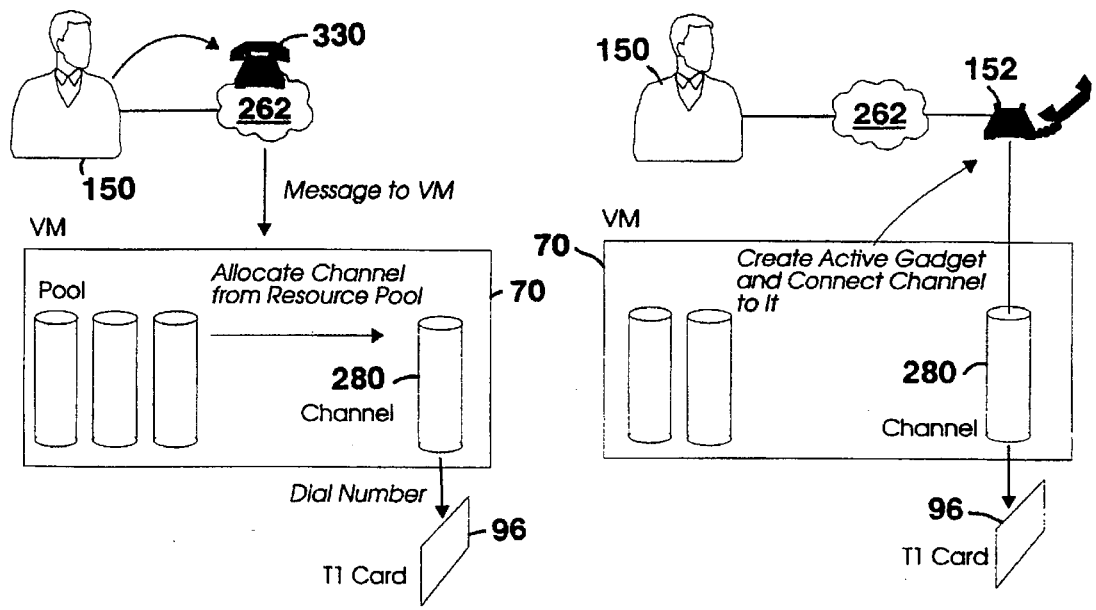
FIG. 18A  FIG. 18B
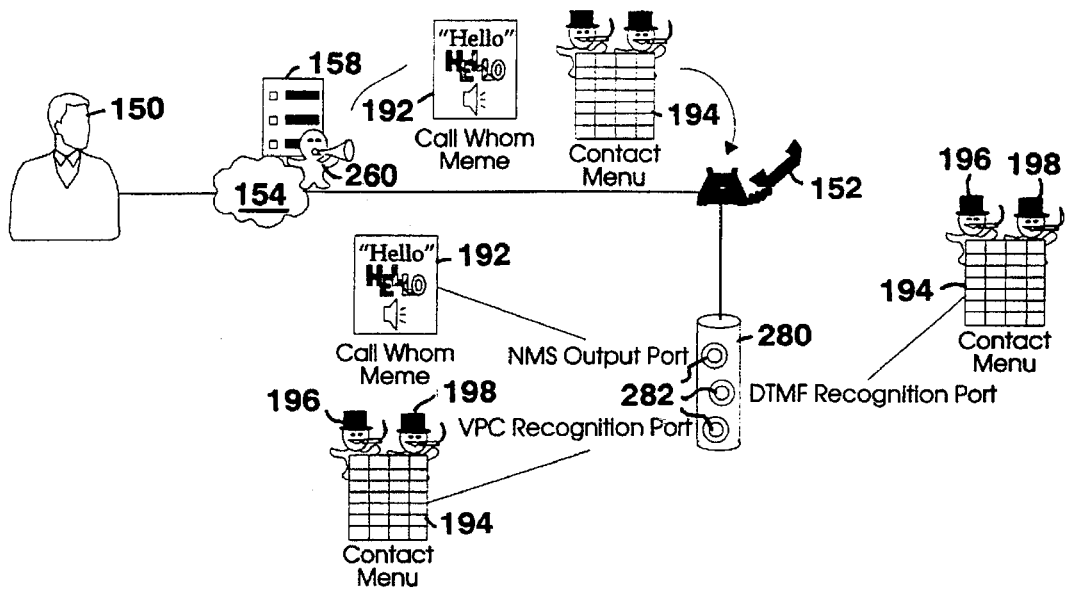
FIG. 19

| SUBSCRIBER | ASSISTANT |
|---|---|
| Create-a-contact | WHAT KIND, PERSON, PLACE or GROUP? |
| Person | PERSON NAME? |
| John Smith | AGAIN PLEASE |
| John Smith | ADD WHICH NUMBER? |
| Work | PHONE NUMBER? |
| 555-1212 # | GOT IT.  NOW WHAT? |
| Update-it | UPDATE WHAT? |
| Phone number | WHICH PHONE NUMBER? |
| Home | PHONE NUMBER? |
| 555-2121 # | GOT IT. |
| Update-it | UPDATE WHAT? |
| Priority | NORMAL OR HIGH? |
| Normal | GOT IT. |
| Update-it | UPDATE WHAT? |
| Spelling | BEGIN SPELLING NOW |
| j-o-h-n-- s-m-i-t-h # | GOT IT. |
|  | WOULD YOU LIKE TO UPDATE THIS ITEM FURTHER? |
| No | DONE. |

FIG. 28

| SUBSCRIBER | ASSISTANT |
|---|---|
| Remind-me | ABOUT WHAT? |
| voice message delivered by subscriber | |
| Enter # | WHEN? |
| Today | TIME? |
| 530 (using touch tone) | TODAY AT 5:30 IN THE AFTERNNON - IS THAT CORRECT? |
| Yes | GOT IT, I'LL SET MY WATCH ALARM. |

FIG. 29

| SUBSCRIBER | ASSISTANT |
|---|---|
| Remind-me-to-call | CALL WHOM? |
| John Smith | WHEN? |
| In 3 hours | IN 3 HOURS. IS THAT CORRECT? |
| Yes | SHOULD I KNOW THE TOPIC FOR THE CALL? |
| Yes | RECORDING... |
| voice message delivered by subscriber | |
| Enter # | GOT IT, I'LL SET MY WATCH ALARM. |

FIG. 30

| SUBSCRIBER | ASSISTANT |
|---|---|
| Find | FIND WHAT? |
| Contact | CONTACT NAME |
| John Smith | CONTACT NAMED JOHN SMITH |
| Describe | JOHN SMITH IS A PERSON SPELLED J-O-H-N S-M-I-T-H<br>HOME PHONE NUMBER IS 555-1212<br>WORK PHONE NUMBER IS 555-2121 |
| Update | WHAT? |
| Phone number | WHICH? |
| Work | I ALREADY HAVE THAT INFORMATION. THROW IT AWAY OR UPDATE IT. |
| Update it | PHONE NUMBER? |
| 555-1313 # | OKAY. ANY MORE PHONE NUMBERS? |
| No | |

FIG. 32

| SUBSCRIBER | ASSISTANT |
|---|---|
| I-Will-Be | DOING WHAT? |
| Taking Calls | WHERE? |
| Mobile | FOR HOW MANY HOURS |
| Two | OK |

FIG. 33

| SUBSCRIBER | ASSISTANT |
|---|---|
| Create-an-Itinerary | DOING WHAT? |
| Taking Calls | WHERE? |
| Mobile | STARTING NOW? |
| Yes | UNTIL FURTHER NOTICE? |
| No | WHEN? |
| For · 2 · hours | FOR TWO HOURS, OKAY? |
| Yes | AND THEN YOU'LL BE? |
| Back on schdeule | |

FIG. 34

NETWORK BASED KNOWLEDGEABLE ASSISTANT

BACKGROUND OF THE INVENTION

The present invention relates to a computer-implemented method and apparatus for managing communications to and/or from a user over multiple media.

Today there are many different, commercially available devices that enable people to communicate with each other electronically. In addition to the ubiquitous telephone that has been around for decades, there now are cordless phones for the home, mobile phones for the car, handheld wireless phones which fit into a person's jacket pocket, pagers, local and wide area computer networks, and facsimile machines, to name a few. Undoubtedly, the number and type of devices and their sophistication will continue to increase over time. Indeed, it is likely that a day will soon arrive when it will be possible for everybody to conveniently and inexpensively be within arms reach of some communication device that enables them to communicate electronically with other people.

The proliferation of different types of communication devices and the increasing diversity of communications media present new challenges. How will communications among the different devices and over the different communications media be coordinated and managed so that people have truly effective access to each other? One challenge is associated with communicating information between and across different communications media. Another challenge is related to handling the inevitable increase in the number of calls so as to maintain accessibility of users. For example, as more people come to rely on their wireless phones to transact business while on the road or away from their offices, their phones are likely to be busy a larger percentage of the time. As a consequence, although a wireless phone can go anywhere with its owner, to the people trying to reach that owner when the phone is in use, the owner will still seem to be as inaccessible as when he did not carry a wireless phone. In addition, the more the owner of such a device uses it, the more likely it will be that he will not know that somebody else was trying to reach him and thus he may miss important calls.

An obvious advantage of many of the new commercially available communications devices is that they offer the possibility of greater mobility to the user. Unfortunately, however, it is not always having to be near the office telephone that ties a business person to the office. The office provides other services that are also important and may not be so mobile. Thus, to fully realize the greater mobility that is offered by the new communications devices and media, these new technologies must be provided in a way that takes into account the business person's dependance on other services besides communications.

SUMMARY OF THE INVENTION

The invention described herein is referred to as an electronic assistant. It is a computer-implemented entity that assists a subscriber with his or her communications by carrying out tasks that are delegated to it. The electronic assistant, modeled to have human-like qualities, recognizes speech and performs functions within the familiar model of an office.

Each subscriber who has an account is assigned at least one electronic assistant which may be dedicated or shared. The electronic assistant offers services to both the subscriber and to any contacts or other callers trying to reach the subscriber. A contact is a person, place, or group that the subscriber has described for the electronic assistant. A contact can be another subscriber or an outside caller. Electronic assistants treat both subscribers and contacts as users of the system.

The electronic assistant offers a wide range of services to its subscriber, among which are the following. The electronic assistant can handle incoming calls from several of the subscriber's personal contacts while at the same time it is doing any of its tasks, including reviewing messages with the subscriber, managing information, etc. It can make logical decisions about how to manage, whether to forward, and where to forward the incoming calls from the subscriber's contacts. The electronic assistant can also communicate with the subscriber and the subscriber's contacts using a wide variety of different communication devices, such as telephones, fax machines, pagers, computer terminals, and communications enabled handheld devices (e.g. Personal Digital Assistants otherwise referred to as PDA's). When the subscriber tries to reach a contact or a contact tries to reach the subscriber, the electronic assistant mediates the connection and then remains available to add value to the session. The electronic assistant can schedule and manage reminders for its subscriber. When reminders come due, the electronic assistant notifies the subscriber.

In general, in one aspect, the invention is a method implemented by a computer-based electronic assistant to receive and manage incoming calls to a subscriber. The method includes the steps of: receiving an incoming call to the subscriber from a caller; establishing a first connection between the electronic assistant and the caller; establishing a second connection between the electronic assistant and the subscriber; over the second connection, electronically notifying the subscriber of the incoming call; in response to receiving a call accept command from the subscriber over the second connection, linking the caller and the subscriber so that they may communicate with each other; upon linking the subscriber to the caller, switching the electronic assistant to a background mode in which said electronic assistant continues to monitor the subscriber over the second connection while the subscriber is linked with the caller; and in response to receiving a summoning command, switching the electronic assistant into a foreground mode. When in the background mode, the electronic assistant responds to a first set of commands including at least the summoning command and when in the foreground mode, it responds to a second set of commands. The second set of commands is larger than the first set of commands.

In general, in another aspect, the invention is a computer-implemented method of processing an electronic reminder that is addressed to a subscriber. The electronic reminder includes subscriber-generated content and a specified time at which it is to be delivered to the subscriber. The method includes the steps of: storing the electronic reminder in an electronic database that is accessible to the electronic assistant; when current time coincides with the specified time, detecting that the stored electronic reminder has become due; in response to detecting that the stored electronic reminder has become due, identifying a communications device through which the subscriber can be reached at the specified time; establishing a connection to the communications device; upon reaching an answering party through the communications device, electronically notifying the answering party that the call is intended for the subscriber; electronically informing the answering party that the answering party may accept the call by issuing an accept reply; if the call is accepted by the answering party, electronically delivering the contents of the electronic reminder to the answering party through said communications device.

In general, in yet another aspect, the invention is a method implemented by a computer-based electronic assistant to receive and manage incoming calls to a subscriber. The method includes the steps of: receiving an incoming call to the subscriber from a caller; in response to receiving the incoming call, establishing a first connection between the electronic assistant and the caller; through a dialog between the electronic assistant and the caller over the first connection, determining the identity of the caller; detecting that the subscriber is presently interacting with the electronic assistant through a second separate connection; electronically alerting the subscriber over the second connection that there is an incoming call for the subscriber; electronically identifying to the subscriber the identity of the caller; monitoring the second connection for a response sent by the subscriber to the electronic assistant directing the electronic assistant how to process the incoming call.

In general, in still another aspect, the invention is a method implemented by a computer-based electronic assistant for managing information and connection resources for a plurality of subscribers including a first subscriber and a second subscriber. The method includes the steps of: receiving a call from the first subscriber to the electronic assistant over a communications media; establishing a first connection between the electronic assistant and the first subscriber; identifying the first subscriber as the source of the call; starting up a first session in said electronic assistant which is a thread of execution of code for managing data and performing functions on behalf of the first subscriber; within the first session, receiving a first command sent by the first subscriber to the electronic assistant over the first connection instructing the electronic assistant to perform a function relating to the second subscriber; responding to the first command by sending a first message addressed to the second subscriber and containing information relating to the first command; in response to the first message, starting up a second session which is a thread of execution of code for managing data and performing functions on behalf of the second subscriber and which is separate from the first session; within the second session, receiving the first message and performing a function that produces a result that is responsive to the first message.

In general, in another aspect, the invention is a computer-implemented method of processing communications through a multimedia interface that includes a plurality of interface devices and a plurality of input/output devices. Each of the interface devices is capable of connecting to a different one of a plurality of different communications networks, and each of the input/output devices is capable of processing a different one of a plurality of media types. The method includes the steps of: establishing a channel representing a physical connection to any selected one of the plurality of communications networks through the interface devices; attaching an appropriate subset of a plurality of ports to the channel, wherein each port represents a different one of the input/output devices and wherein the appropriate subset of ports includes ports which correspond to input/output devices that are capable of connecting to the selected communications network; executing an operation that generates an item of information that is to be communicated through the multimedia interface to at least one of the communications networks; retrieving from a memory a multi-media reference to the item of information, wherein the multi-media reference contains a plurality of references to the item of information, each of which refers to the item of information in a different one of a plurality of formats, each of which is of a different media type; passing the multi-media reference to the ports attached to the channel; in response to receiving the multi-media reference at the attached ports, retrieving the item of information from memory in a particular one of the formats identified in the multi-media reference; and passing the retrieved item of information to an input/output device for delivery over the connected communications network. The step of retrieving is performed by one of the attached ports that is capable of processing the format of the retrieved item of information and the input/output device to which the retrieved item is passed for delivery is the input/output device that is associated with the attached port that retrieved the item of information from memory.

In preferred embodiments, the electronic assistant enables the individual to manage and customize his availablilty to friends, family, business associates, customers and strangers depending upon the time of day, day of the week and his or her needs. In addition, the electronic assistant has the subscriber's schedule and therefore knows where the subscriber is, what he is doing, what his availability is, and how to reach him (e.g. through what communications device). The schedule is used to manage the accessibility of the subscriber to others and his visibility to other subscribers on the system.

Other advantages and features will become apparent from the following description of the preferred embodiment and from the claims.

BRIEF DESCRIPTION OF THE DRAWINGS

FIGS. 6A-H illustrate the process of completing a task and the objects that are involved;

FIG. 7 illustrates the use of the box, the hand and the finger in manipulating items;

FIG. 8 shows a sample MMUI menu;

FIGS. 18A-B illustrate the process of creating a channel and the objects that are involved;

FIG. 19 illustrates the operations for presenting memes and menus to ports;

FIG. 28 shows a "Create-A-Contact" dialog with the electronic assistant;

FIG. 29 shows a "Remind-Me" dialog with the electronic assistant;

FIG. 30 shows a "Remind-Me-To-Call" dialog with the electronic assistant;

FIG. 32 shows a "Find" command dialog;

FIG. 33 shows an "I-Will-Be" dialog; and

FIG. 34 shows a "Create-An-Itinerary" dialog.

DESCRIPTION OF THE PREFERRED EMBODIMENTS

Figure 1:
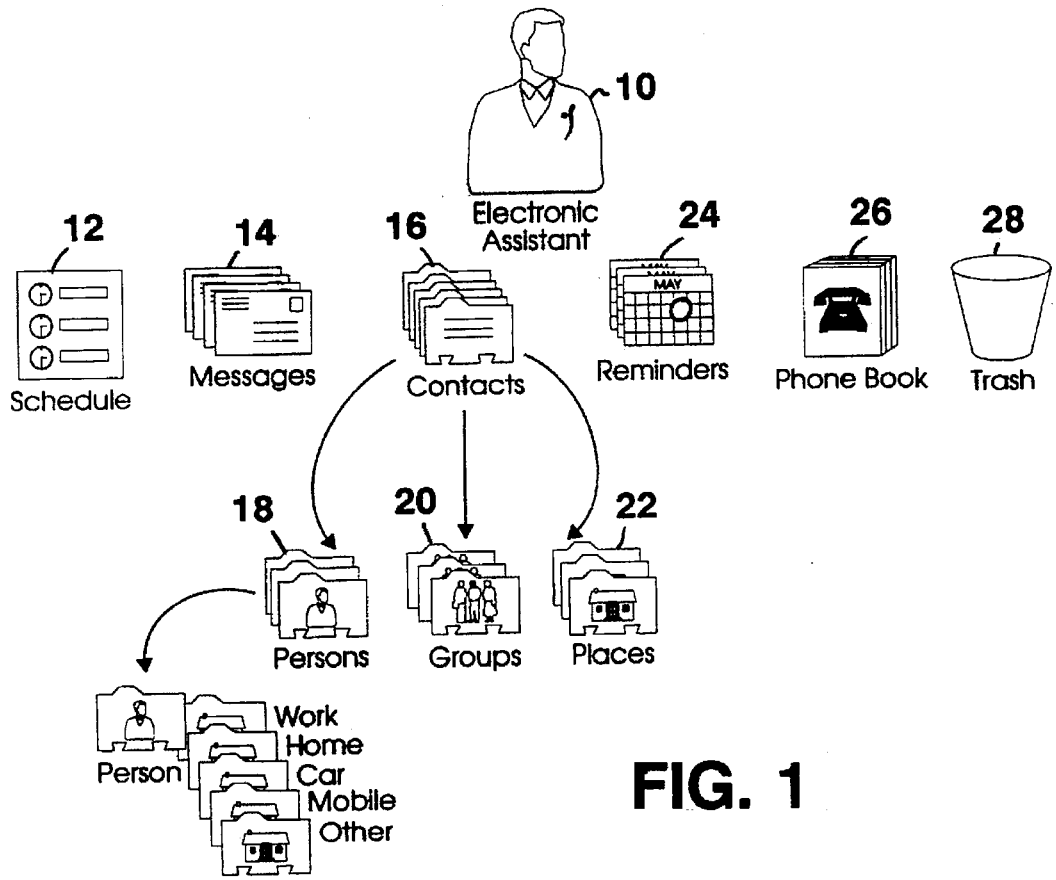
FIG. 1 shows the electronic assistant and office items.

The Virtual Office:

As illustrated by FIG. 1, a subscriber works with an electronic assistant 10 using a "virtual office" as a model. The electronic assistant 10 works in an office containing the subscriber's objects, which are called "items". An item is a piece of information that the electronic assistant stores in a database and works on for the subscriber. The subscriber can use spoken or DTMF commands to have the electronic assistant work on various items, and the electronic assistant then uses a dialog to gather the information it needs from the subscriber to complete the task.

An item may be any one of the following: a schedule 12, a contact 16, (e.g. a person 18, a place 22, or a group 20), a message 14, a reminder 24, a phone book 26, or trash 28. Messages can include other items, such as a contact, reminder, page, etc. In derivative implementations, a message could be any sort of multimedia or composite information.

A "schedule" lists where the subscriber can be reached and at what time. There is a default schedule and an override schedule. The default schedule is the subscribers daily or weekly schedule; it is entered by a system administrator. Subscribers can override the default schedule with a "I-Will-Be" or "Create-an-Itinerary" commands to create an override schedule (see Exhibit A at the end of the specification for a list of spoken and DTMF commands that an electronic assistant implements). The "I-Will-Be" command enables the subscriber to indicate when and where he can be reached and his availability at those times.

A "contact" is the subscriber's view of a person, place, or group. The subscriber can use a contact as the recipient of a command, such as placing a call or sending voice mail. A contact is analogous to an entry in an address book file. An "outside contact" is a contact that is not a subscriber.

A "person" is a representation of a person, which describes another subscriber or someone outside the system. The description includes the spoken name, spelled name, priority, gender, and a list of places where the person can be reached.

A "place" is a location with a single address (e.g. a phone number, fax number, network id, etc.) associated with it. Each person can include a standard set of places: work, home, car, mobile, and other. A corporation, department, or other organization is also considered a place, and can include a phone number and fax number.

A "group" is a user-defined set of persons, places, and/or groups.

A "message" is a piece of information that is addressed to a person or group. The most common type of message is voice mail.

A "reminder" is a notice to be delivered at a future time. The reminder can be a notice to call a contact about a particular subject ("call reminder") or a notice containing a recorded audio message about another subject ("recorded reminder").

A "phone book" is a list of other system users that is published for easy access by subscribers.

The "trash" is a collection of all the items that the subscriber has thrown away.

In the described embodiment, the electronic assistant can recognize specific words or phrases, which are called utterances. To recognize a subscriber's speech, the electronic assistant gathers training utterances from the subscriber, which are recordings of the way the subscriber pronounces a word or phrase. The process of gathering these training utterances is sometimes referred to as training in that the subscriber is training the electronic assistant to recognize his voice. For example, the electronic assistant may ask the subscriber to say his full name several times or the name of a command several times. These utterances are then compiled into a compressed format known as a vocabulary. A "vocabulary" is a finite set of recorded words and phrases that can be used directly by the system's speech recognition hardware to recognize the subscriber's speech.

The electronic assistant uses two different kinds of vocabularies, namely, a speaker-dependent vocabulary and a speaker-independent vocabulary. The "speaker-dependent vocabulary is used to recognize the speech of users who have explicitly trained the electronic assistant with their own pronunciations. The speaker-independent vocabulary is used to recognize a multitude of different voices without requiring each user to train the system.

In addition to these different kinds of vocabularies, the electronic assistant uses two different methods to recognize speech, namely, continuous recognition and discrete recognition. Continuous recognition recognizes naturally spoken words or sequences of words, that is, words without artificial pauses between them. In the described embodiment, there are two vocabularies recognized with continuous recognition: numbers (the digits "one" through "nine", "zero", and "oh") and yes/no ("yes" and "no"). Continuous recognizers also discriminate against words like "um" and "ah". Discrete recognition recognizes discrete, isolated words or phrases, or sequences of distinctly spoken words that are separated by pauses.

The electronic assistant responds to a variety of commands (see Exhibit A). Some commands operate on the current context in the hand (described later), while others do not. Some commands start a dialog between the electronic assistant and the subscriber so the assistant can gather the information it needs to carry out the task. For example, to call a contact, the subscriber can use the "Call" command:

| Subscriber | Assistant |
| --- | --- |
| Call | Call Whom? |
| Bill Bishop | Where? |
| Work | Dialing . . . |

Functional Description of the User Interface

Before going into the details of the hardware and the software architecture of the system, a description of how the system handles an incoming call to a subscriber will first be presented. This will provide the context for then describing the underlying mechanisms that are implemented within the system to achieve their functionality.

Throughout the remainder of this specification except where noted, it will be assumed that the subscriber is named John Smith and the caller is named Bill Bishop.

When a caller calls into the system in an attempt to reach a particular subscriber (i.e., by calling a telephone number that is assigned to that subscriber), the system answers the call. By playing back audio signals that are stored in the system's database, the system announces to the caller:

Good Morning, I'm the electronic assistant for John Smith. Please say your full name.

The caller replies by stating his name:

Bill Bishop

The system records the caller's utterance and using a speaker dependent dictionary that is stored within the system's database, it attempts to recognize the caller. If the system cannot recognize the caller's name, it responds by playing the following message:

Using DTMF's, enter your area code and phone number followed by the # key.

The user enters his telephone number as requested. The system decodes the DTMF and then searches a contact list for the subscriber to find a contact with that telephone number.

If the system succeeds in recognizing the caller on the basis of his phone number, it then plays the following message to the caller:

Would you like to take a moment to teach me how to recognize your name better?

The caller may accept this offer by pressing "9" on his DTMF key pad. The system then responds by playing the following message:

Please repeat your full name.

After repeating this operation a second time, the system stores the vocalizations with the identity of the contact. The next time the caller contacts the system, it will use the stored vocalization of the caller's name to recognize the caller.

Once the assistant either recognizes the caller either through a match with a stored vocalization or through the caller's phone number or labels the caller as unknown, it then attempts to locate the subscriber. It does this by carrying out a sequence of operations the first of which is to check the subscriber's status. If the subscriber currently has a connection established with his assistant (and he has not enabled a do not disturb function), then his status is available. If the subscriber is not connected, then the assistant may check a secondary information source (such as a cellular network) to determine the subscriber's availability. Finally, the assistant will check the subscriber's schedule. The subscriber can set his availability to indicate that he is accepting all calls, he is accepting no calls, or he is accepting only important calls.

If the subscriber is not accepting any calls, the system plays the following message to the caller:

Sorry, he's not available. Please leave a message and then hang up or press the "#" key. Recording.

After the caller has finished, the system may send a non-interactive notification to the subscriber that the caller has just tried to reach him. It does this by, for example, sending a page through its pager interface or sending an E-Mail message to the subscriber's workstation. The notification identifies the caller and it indicates whether voice mail was left.

If the subscriber is accepting only important calls, the system checks the subscriber's contact list to determine what the caller's priority is. The subscriber can designate the contact as either high priority or normal priority and this information is stored with other information about the contact. If the caller has only normal priority, the system reports that the subscriber was not available and offers the caller the option to leave voice mail, as previously described. On the other hand, if the caller has high priority, the system continues its attempt to locate and notify the subscriber of the call.

In the event that the subscriber is accepting all calls, the system continues its attempt to locate and notify the subscriber of the call without regard to the caller's priority designation.

As a first step in locating the subscriber, the system determines whether the subscriber is already connected to the system, either through another call or through some other communications medium (e.g. logged into his computer). If the subscriber is on another call being handled by the system, the system briefly interrupts that call to notify the subscriber that he has a call waiting and it identifies the name of the caller. If the caller is also logged onto the system through his computer, the system may also send a visual message to the workstation notifying the subscriber of the call and identifying the caller.

The subscriber then has the option of accepting the call, asking the system to place the caller on hold while he completes his present call, or asking the system to take a message.

If the subscriber accepts the call, the electronic assistant responds by immediately establishing a connection between the caller and the subscriber. If the subscriber instructs the system to take a message, the system offers the caller the voice mail option previously mentioned. If the subscriber instructs the system to place the incoming call on hold, the system informs the caller that subscriber will be with him shortly. When the subscriber has completed his other call, using spoken commands, he instructs the system to then establish a direct connection with the new caller.

If the system determines that the subscriber is not presently on a call but is connected to the system or reachable through his workstation or other two-way data device, it may send a message that is displayed on the device's display screen. The message includes a menu which offers the subscriber the option to accept or not accept the call. If the subscriber accepts the call, the system notifies the caller that the subscriber will be with him shortly. In the meantime, the subscriber calls into the system over another phone and the system connects him with the caller.

If the subscriber does not accept the call or does not respond within some predetermined period of time, the system notifies the caller that it was unable to locate the caller and offers the caller the option to leave voice mail.

If the electronic assistant does not detect the presence of a subscriber on the system, the electronic assistant checks whether his location is indicated on one or more schedules that the system keeps for the subscriber. If there is a schedule that places the subscriber at a particular location at that moment and there are phone numbers identified with that location, the electronic assistant places a call to one of the phone numbers. Additionally, the assistant may check one or more additional sources of subscriber location information (such as cellular network databases).

If a party answers the call, the electronic assistant plays the following message to the answering party:

Hello, I'm trying to reach Jim Smith. If he is available, press the 9 key. If he is not available, press the 6 key or hang up.

If the party answering the call indicates that Jim Smith is available, the electronic assistant then says:

There is a call from Bill Bishop. Do you want to take the call? Indicate Yes by pressing the 9 key, indicate No by pressing the 6 key.

If the party indicates that they will accept the call, the electronic assistant connects the caller to the subscriber.

In the event that electronic assistant is unable to establish a connection with the subscriber, the electronic assistant may send a non-interactive notification to the subscriber indicating that Bill Bishop has called him at a specified time.

Hardware architecture

Figure 2:
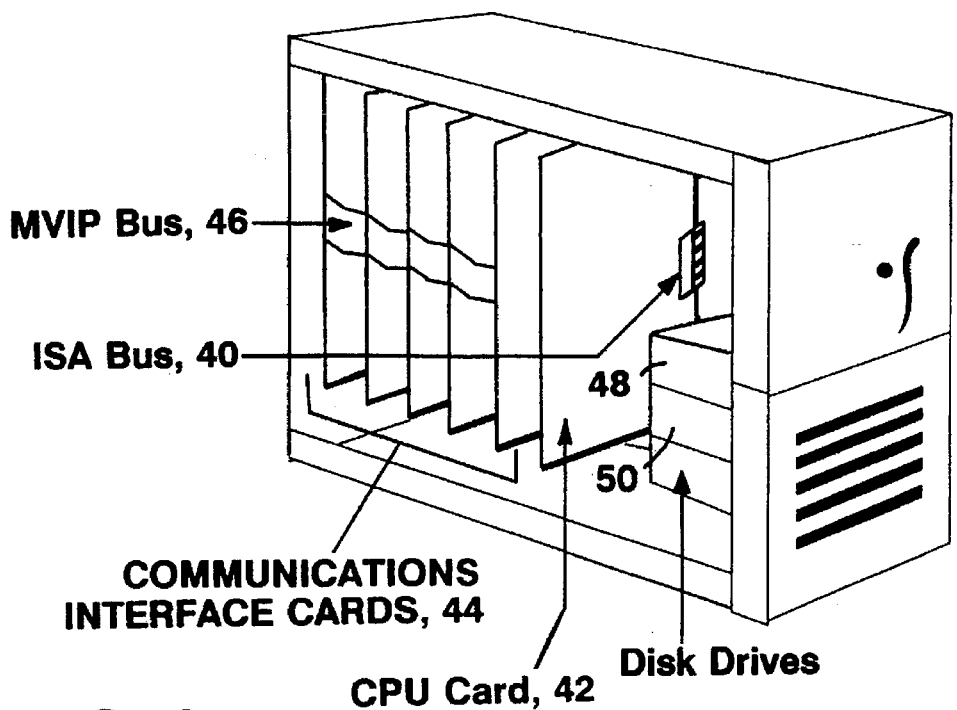
FIG. 2 shows the hardware platform.

FIG. 2 shows the basic hardware components of the described embodiment. The system consists of a high-performance 486 computer equipped with an ISA bus 40 with a passive backplane. The computer includes a CPU card 42 and display adapters (not shown). The passive backplane is a standalone bus that is not part of the CPU card (i.e., the motherboard). A set of ISA adapters (not shown) plug into the passive backplane to form 486 computer system. Interface cards 44 and the CPU card connect directly to the ISA bus. The passive backplane can hold up to 20 interface cards.

The interface cards are special-purpose cards to support many different forms of connectivity and communication. They include network cards to connect with standard digital telephone lines as well as special-purpose adapters for recognizing speech, making phone calls, and sending and receiving faxes, etc.

A Multi-Vendor Integration Protocol (MVIP) bus 46 consisting of a 40-pin ribbon cable is connected to all of the interface cards providing telephone services. The MVIP bus is a high-speed communications channel that carries all audio traffic between interface cards and switches telephone lines.

Finally, the system also has fixed and removable storage including a set of high-capacity, high-speed disk drives 48 and a floppy drive 50.

A base system, supporting 8 ports, has 2 GB of disk space and 32 MB of memory with an additional 1 GB of disk space and 8 MB of memory for each additional set of 8 ports. The described embodiment, supports a maximum of 24 ports.

In the described embodiment, the following specific hardware is used. The line interface cards are either Natural MicroSystems DTI-48 T1 cards supporting connection of two T1 trunks or Voice Technology Group Voice Bridge PC PBX cards supporting 8 lines of PBX station set emulation. The line processing cards are Natural Microsystems AG-8 cards, each supporting 8 telephone channels. The ASR daughter cards are Natural MicroSystems DB-31's and there is one DB-31 card for each AG-8 line processing card. The daughter card performs speech recognition on names only. Another ASR card which is provided is a VPro-84 from Voice Processing Corporation. There is one VPro-84 card for each AG-8 line processing card. The VPro-84 card performs speech recognition on commands and digits and supports up to 8 discrete recognizers or 4 continuous recognizers.

The MVIP bus supports up to 256 full-duplex telephone connections. The 256 full-duplex connections are time-division multiplexed (TDM) so that only 32 separate signals are transmitted, with each signal divided into 8 time slots. Interconnections between two communications channels is accomplished by enabling through software control each of the channels to have access the time slots of the other channel. That is, the input of each channel is permitted to listen to the output of the other channel.

Other Possible Hardware Configurations

The description above presents one possible architecture which concentrates a number of hardware elements within a single computer chassis, including multiple special purpose interface cards connected together with a special purpose bus. Many other hardware organizations could also be used to support the functionality described. The basic abstract elements needed are: (1) one or more basic computer resources to support the program and data as described; (2) support for one or more incoming communications channels and support for receipt and generation of connections on the respective channels; and (3) a switching resource to switch multiple communications channels together It is possible for these resources to be distributed across multiple systems. For example, in one possible implementation a separate switch resource could be connected to computers which contain hardware for managing communications channels. These computers which manage the communications channels are then connected via a network to larger systems which run the applications and provide database services. The applications and database services could be further split up across multiple systems.

In yet other hardware configurations, one might wish to consolidate the resources even more than is described for the present embodiment. For example, a single computer could have a plug in card, or support on the mother board, to handle the communications channels. Switching could be done between these channels in hardware or software. In this way the applications and database would run on a single computer with the necessary hardware support to manage all necessary communications channels.

Software architecture

This following description presents two different views of the system's software architecture: one emphasizing functional components and the other emphasizing processes and events.

Figure 3:
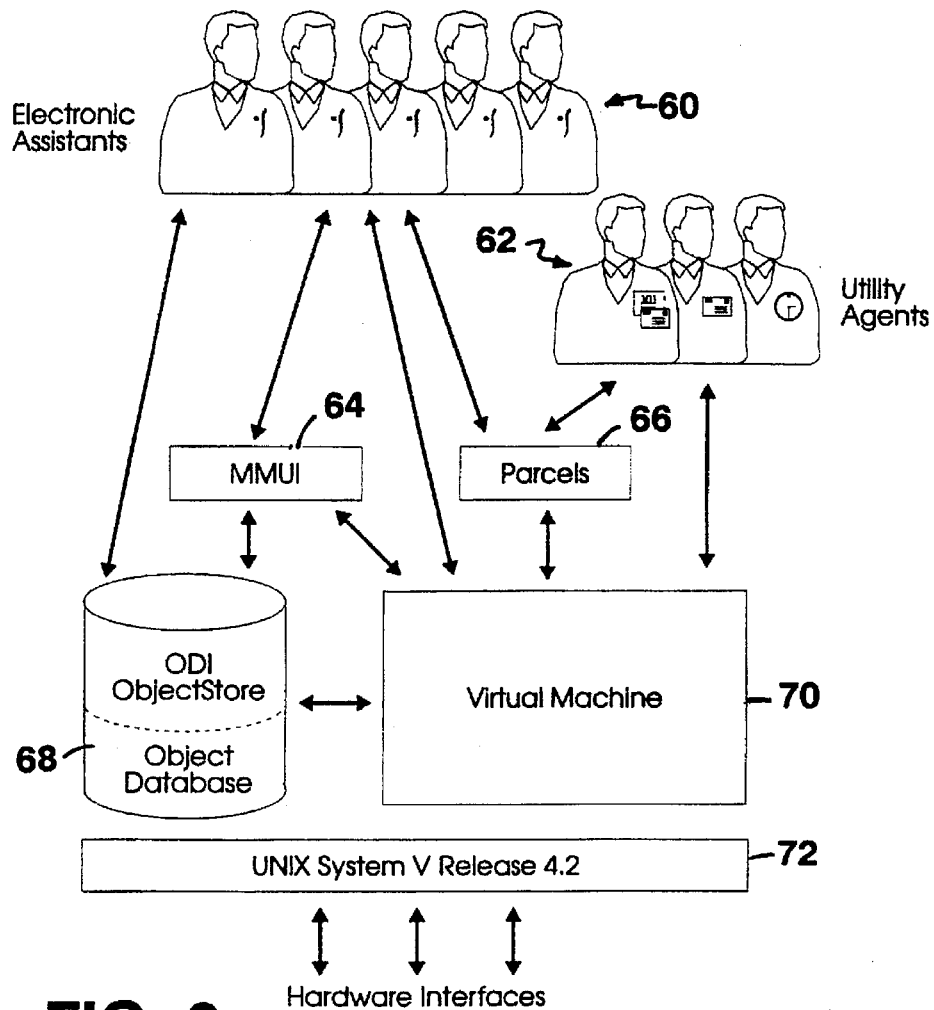
FIG. 3 is a functional overview of the software architecture.

Functional View:

FIG. 3 shows the high-level software architecture of the system. In this and subsequent illustrations of processes, the structure objects are represented symbolically by icons which have an appearance relating to the function of the entity being represented.

The system includes four primary components. One primary component includes assistants 60 and agents 62. The assistants carry out tasks on behalf of users and the agents carry out tasks on behalf of assistants. Another primary component is a communication mechanism including a Multimedia User Interface (MMUI) 64 and a parcel mechanism 66. These allow assistants and agents to communicate with other system components. A third primary component is an object database 68 which stores user information, such as contacts and messages, and system information, such as prompts. And the fourth primary component is a Virtual Machine (VM) 70 which services requests from assistants and agents as well as hardware devices. The arrows in FIG. 3 show the primary paths for the flow of interactions between the various components.

The described embodiment uses the Univel Unixware™ operating system 72 which is based on the UNIX System V Release 4.2 operating system. The object database is the ObjectStore™ object-oriented database by Object Design, Inc.

Other Possible Software Configurations

In the described embodiment, the VM, Assistants, Agents and Database all reside on one host computer. There is nothing in the architecture, however, that necessitates this. Other implementations could separate these components and have them run on separate computers using the previously mentioned remote procedure calls to communicate between the different processes.

Process View

Figure 4:
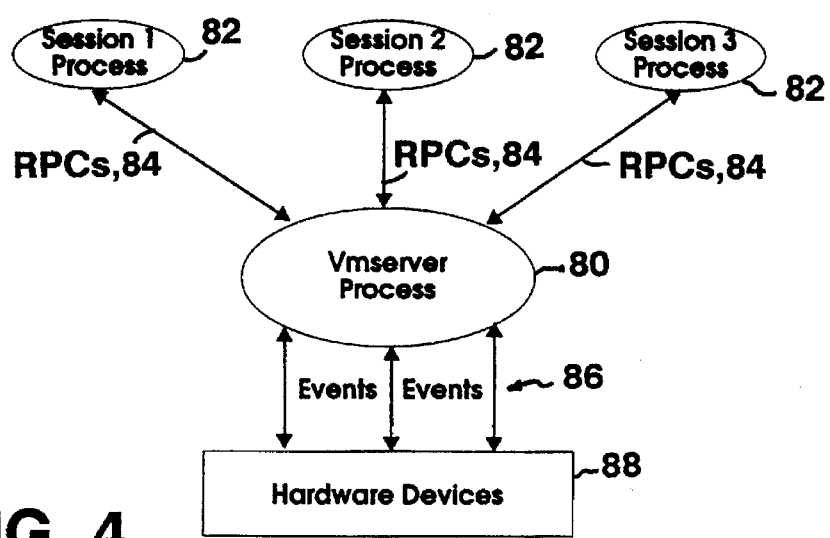
FIG. 4 is a process view of the software architecture.

FIG. 4 summarizes the process architecture of the system. The system consists of a Virtual Machine service process 80 (vmserver) and one process 82 for each instance of an electronic assistant or agent. Each session process communicates with the vmserver using RemoteProcedureCalls (RPCs) 84. The vmserver services these RPCs from the session processes and also services events 86 from hardware devices 88.

Figure 5:
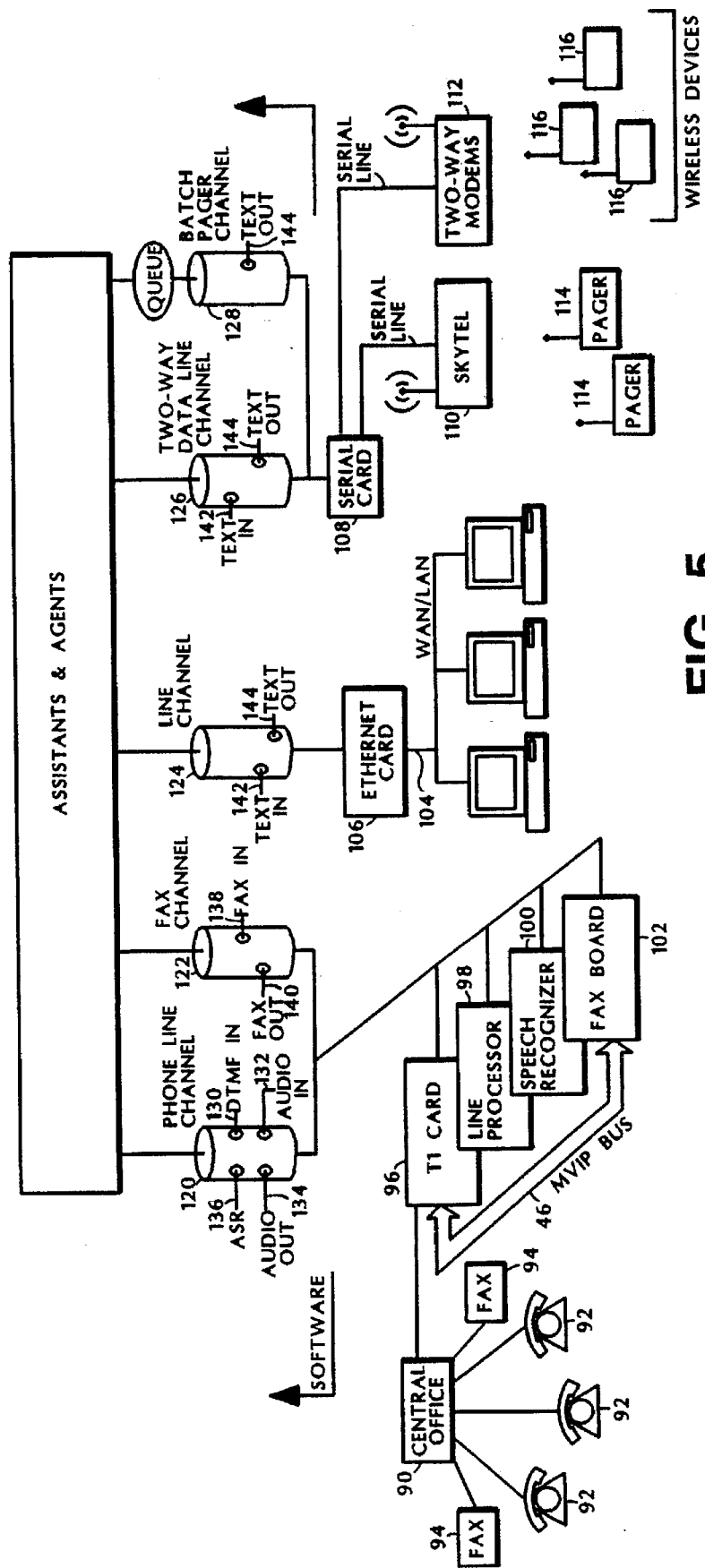
FIG. 5 is a functional block diagram of the system highlighting the hardware interface to the communications channels.

The Interfaces to the Communications Media:

FIG. 5 is a block diagram view of the system highlighting the hardware interface to various communications channels. A central office 90 which receives incoming calls from telephones 92 and fax machines 94 forwards them over a T1 line to a T1 interface card 96 in the system. The T1 interface cards are connected to the MVIP bus 46 along with other cards including a line processor card 98, a speech recognizer card 100 and a fax board card 102. The line processing card does coding and decoding of speech, i.e., it plays audio that is stored in the database and records audio for storage in the database. It also decodes DTMF signals (DTMF). The speech recognition card performs the speech recognition function using a vocabulary supplied to it from the database. The vocabulary might be a speaker dependent vocabulary generated by the user or a speaker independent library.

There may be one or more T1 lines coming into the system. It is likely, however, that there will be many more phone numbers assigned to the system than there are T1 lines. Numbers are not mapped to particular lines. Rather, when the central office receives a call intended for one of those numbers, it simply selects from among whatever lines are available at the time and sends a ring signal to the system over the selected line. When the interface card for that line answers the incoming call (i.e., connects to the line), it receives from the central office a sequence of DTMF (four digits) identifying the extension that is being called. Using this four-digit sequence identifying the extension and the subscriber's numbers stored in its database, the system is able to identify the subscriber for whom the call is intended.

In the described embodiment, the system can also establish connections to a Wide Area Network (WAN) or a Local Area Network (LAN) 104 through an ethernet card 106. In addition, it can establish connections to various other communications devices through one or more serial interface cards 108. In FIG. 5, serial card 108 has two serial ports, one of which is connected to a SkyTel™ system 110 over one serial line and the other of which is connected to a two-way modem 112 over another serial line. The SkyTel™ system 110 transmits one way communications to pagers 114. The two-way modem 112 exchanges two-way communications with wireless devices 116 such as PDA's (personal digital assistants).

FIG. 5 also presents a logical view of the mechanisms which the system uses to connect to communications channels through the interface cards. To connect the system to different communications media, the system establishes various channels or communications paths including a phone line channel 120, a fax channel 122, a TTY line channel 124, a two-way data line channel 126, and a batch pager channel 128. For each channel, there is a set of ports that can be attached to it. The ports, which are represented in software by port objects, refer to input/output devices supported on the interface cards.

In the software, each of the line channels is represented by an object, i.e., a data structure which identifies the physical line to which that particular channel maps. The data structure also includes a list of the ports which can be attached to the channel. Each port is represented by a port object and is supported by the functionality found on the interface cards that are connected to the system. That is, each port represents a logical digital signal processor on the particular interface card which implements the functionality associated with that port.

FIG. 5 shows the ports that can be attached to the various channels. The phone-line channel can have a DTMF port 130, an audio-in port 132, an audio-out port 134, and an ASR (automatic speech recognition) port 136. A fax channel can have a fax-in port 138 and a fax-out port 140. Both the TTY line channel and the two-way data line channel can have a text-in port 142 and a text-out port 144. The batch pager channel can have a text-out port 144.

For the phone line channel, the DTMF port represents the capability of receiving and interpreting DTMF signals sent to the system over the T1 line by the caller. The audio-out and audio-in ports represent the capability on the line processor cards to both generate and record audio over the communications channel. The ASR port which is implemented by the speech recognition card performs the automatic speech recognition on the audio.

Note that throughout this description the term "call" is used in its most general sense. Not only does it include a call placed over the telephone lines but it also includes the initiation of any contact over any of the other communications media including wireless communication channels, computer networks, fax channels, etc. Thus, the concept of a call is not meant to be limited only to a telephone call.

While the described embodiment includes a limited number of channels and ports, the architecture can be expanded to handle new channels or ports providing for future forms of connections and capabilities.

The four primary software components will now be described in greater detail.

Assistants and agents

The system is designed to support many different kinds of agents. All agents and assistants are based on a generic agent object. Before exploring the specific agents used in the system, this generic agent will first be described.

Agents, sessions and gadgets:

An agent is a software entity that performs an action or brings about a certain result on behalf of a user or another agent. To communicate with users, an agent engages in dialogs using gadgets. A gadget is a representation of a communications device, such as a phone, fax machine or pager. A gadget includes a description of the communications device as well as its address. For example, a phone gadget contains the area code, number, and extension for a particular telephone. To communicate with a specific user over the telephone, an agent uses the phone gadget for that user.

To use a gadget, the agent adds it to a session. In the case of a phone gadget, the VM dials the phone number and returns an active gadget to the agent's session. An active gadget represents the connection from an agent's session through a communications network to a communications device. The active gadget represents a transient connection to the persistent gadget. An active gadget can be used for communicating with users, while a gadget itself cannot because it just stores the address and capabilities of the device. For example, a phone gadget specifies the number 617-555-1212, while the active gadget represents an active phone line on which the number has already been dialed. A session consists of a collection of zero or more active gadgets connected together.

To communicate with users, agents may need to add capabilities to active gadgets. A capability is a representation of an ability or feature of a device, such as the ability to recognize speech or play audio. For example, if an agent needs to fax materials to a user, it adds the fax capability to the active gadget. A discussion about how the VM handles capability requests from agents is presented later in the discussion of the VM. For other embodiments that include a graphical interface, a capability that outputs graphics and input capabilities that track the user's focus (i.e., mouse, eye, etc.) and gathers input from the user is envisioned.

Agents can work with many different kinds of active gadgets simultaneously. For example, an agent can be simultaneously placing an outgoing call, sending a message to a pager, and sending a message to a fax machine.

User agents, tasks, and presenters:

A user agent is an agent that is capable of communicating with humans as well as with gadgets. User agents use media-independent dialogs to communicate with users. These dialogs consist of a prompt from the user agent and a response from the user. When a user agent is communicating with a user, it directs its dialogs to an active gadget known as the focus gadget. For example, if a user agent is placing a call for the user with one active gadget and talking to the user with another active gadget, the latter gadget is the focus gadget. Other embodiments may group a set of gadgets to be used as the focus gadget. This would allow the assistant to interact with the gadget set and have the interaction span all gadgets in the set.

User agents can also connect active gadgets together for phone conversations. When the user agent places an outgoing call for the user, and the called party answers the phone, the user agent connects the two active gadgets together and then goes in the background. When the user agent is in the background, it is idle; to delegate additional tasks to the user agent, the user needs to bring the user agent back into the foreground.

A unique feature of user agents is their ability to handle tasks. A task is an action to be carried out by a user agent on behalf of a user. A task may consist of a form full of fields that the agent gives to a presenter. A presenter is an object that knows how to engage in a dialog with a user over a given medium as part of filling in the fields of a task. An agent gives each task to a presenter. The presenter gathers information for a field and then hands the task back to the agent. The agent looks to see if a field changed recently and examines it. For example, the agent may request information from the database and adjust the next field in the form. Then the agent hands the task back to the presenter, and it gathers information for the changed field. This activity of handing the task back and forth between the agent and the presenter continues until the agent is satisfied that all required fields are complete. Then, the agent executes the task.

FIGS. 6A–H illustrate the process of assigning a task and monitoring its progress. In this example, a user agent 150 has obtained a focus active gadget 152 for its session 154 and a user 156 has issued the "call" voice command (FIG. 6A). In response, the agent assigns a call task 158 to a phone presenter 160 (FIG. 6B). The presenter interacts with the user over the focus gadget to fill in the fields of the task (FIG. 6C). The presenter gathers the name of the contact to call and places it in the first field before handing it back to the agent (FIG. 6D). The agent notices that this field changed and looks up the contact in the object database 68 (FIG. 6E). The agent adjusts the second field of the form to include the valid places defined for this contact and hands the task back to the presenter. The presenter gathers the location where to call the contact and places it in the second field before handing it back to the agent (FIGS. 6E–F). Once the fields of the task are filled, the user agent places the call (FIG. 6H).

A user agent obtains the list of tasks to carry out from an object known as the task stack. When the agent receives parcels (to be described shortly), it may decide to place tasks on the task stack as a result of processing the contents of the parcel. The user agent gets the next task from the stack and carries it out. It repeats this process until there are no more tasks on the stack, and then it exits. In the process of carrying out a task, another task may be pushed on the stack.

A task is not the only way that an agent interacts with a user. For simple interactions, the agent uses a C++ method. Tasks are used primarily for complex interactions.

Assistants and Electronic Assistants:

An assistant is a user agent that is capable of making logical decisions and performing complex tasks on behalf of its users. The entity that will be referred to hereinafter as the electronic assistant is an assistant that assists users with their calls, messages, contacts, and schedule. Each subscriber has an electronic assistant. As an example of a complex task that distinguishes the Electronic Assistant from an ordinary user agent, the electronic assistant can locate a user by consulting the user's schedule and deciding which numbers to call.

Up to this point, three different classes of agents have been discussed: agents, user agents, and assistants. Table I summarizes the distinctions among them.

Distinctions Between Agents and Assistants

TABLE I

| Agent Type | Description |
|---|---|
| Agent | A software entity that performs an action or brings about a certain result on behalf of a user or another agent. |
| User agent | An agent capable of communicating with humans using media-independent dialogs and carrying out tasks on a user's behalf. |
| Assistant | A user agent capable of making logical decisions and performing complex tasks. |

Any agent can logically run several sessions simultaneously. Each time an agent handles a session, there is a separate process running for each session. The master session is the session in which the electronic assistant is talking to its subscriber or trying to locate its subscriber. There can never be more than one master session running per subscriber.

Box, Hand and Finger:

Referring to FIG. 7, the electronic assistant uses three different objects to manipulate its user's items, namely, a box 170, a hand 180, and a finger 182. The box is an object that contains all the items belonging to a user. The hand is an object that holds the items that the user is manipulating. The finger is a software pointer that marks the currently selected item in the hand.

When the subscriber asks the electronic assistant to "Find" items, such as contacts, the electronic assistant looks in the box for the items and then picks them up in its hand. The hand can pick up a subset of the items in a box according to certain criteria. For example, when the subscriber asks the electronic assistant to find saved messages, it only finds the messages that are marked with a saved flag.

When the user asks for the first item, the electronic assistant moves its finger to that item and selects it. If the user asks for the next item, the electronic assistant moves its finger to the next item in its hand. The items in the hand can be accessed in a circular fashion. If the finger points to the last item in the hand and the user asks for the next item, the finger moves around to the first item in the hand.

Sequential vs. Random Access to Lists of Information

Using first-item and next-item provides the ability to browse a set of items in a sequential fashion. So, if a subscriber instructed their assistant to Find New-Message, then using next item and previous item would give the ability to traverse through the new messages in forward or reverse order. First item would return the finger to point to the beginning of the list.

In addition to this form of sequential navigation through items in a list, the system also provides capabilities to access information randomly or based on more complex queries. For instance, a subscriber can ask to see all the new message from a particular contact. The following dialog:

| Find | <find what> |
| New-Messages-From | <new message from whom> |
| Bill-Bishop | | would put into the hand all messages that had been received from the contact named Bill Bishop. This feature can also be extended to the group items which a subscriber can create. As a result, if a subscriber has a group called Hot-Prospects, the above dialog could be repeated as:

| Find | <find what> |
| New-Messages-From | <new messages from whom> |
| Hot-Prospects | | and the result would be a list of items that includes new messages from members of the group Hot-Prospects. In addition to searching for items from a particular contact, this technique can be used to fetch items that have been stamped as priority or urgent, etc. Finally, all of the items described herein can be randomly searched for and collected into the hand based on different attributes.

Context:

The ability to Find items and gather them into the hand introduces into the system a concept of state. This state includes the current contents of the hand and what is being pointed to. Since some number of commands may need to be issued to change the state, and since it is often desirable to go back to one of the previous state, the system supports an ability to "Go-Back" to the previous states. Each time a change in the state of the assistant occurs, the new state is stacked on top of the previous state. Issuing the Go-Back command pops the previous state of the stack.

For example, let's assume the assistant is holding and pointing to a contact named Bill Bishop and the subscriber issues the following commands:

| Find | <find what> |
| New-Message | <one new message from Bill Bishop> |
| What's-It-Say | |
| GoBack | |

In this example, the subscriber replaced the contents of the hand (which had been holding a contact for Bill Bishop) with a new message from Bill Bishop. After listening to the message (as a result of issuing the What's-It-Say command) the subscriber said Go-Back. The result of this command is that the previous state of the hand (the single contact for Bill Bishop) is restored. The subscriber can now manipulate this contact for Bill Bishop.

Another useful tool for managing state is the ability to refer to the current item being pointed to in dialogs. The utterance "This-One" is used to refer to an object currently being pointed to by the assistant in the hand. The item is also referred to as "it" so that commands such as "Describe-It", "Update-It", "Throw-It-Away" also refer to the current item. Finally, the commands "Send-A-Copy", "Send-A-Reply" and "Give-Them-A-Call" are operations on the current items to which the assistant's finger is pointing. These draw on the context and leverage on a shared understanding between the subscriber and the assistant of the context. The result is a set of condensed dialogs that do not need to explicitly refer to objects which can be inferred. Other embodiments can take advantage of pronouns such as "him", "her" and "them" to refer to objects that have recently been referenced.

Parcels

Agents can communicate with each other using parcels. A parcel contains the address of the sender (From), the address of the recipient (To), and contents (a persistent object). The contents of a parcel can also be another parcel.

The VM guarantees delivery of parcels. Any parcels addressed to a user are delivered to the master session for that user. If no master session exists, the VM starts one. Then, the electronic assistant tries to locate the user from within the master session. In other embodiments, parcel addresses can support distributed boxes and may support communication between remote agents.

Agent to Agent Communication

The fact that the VM acts as the routing and delivery mechanism for parcels is powerful. It allows all agent to agent communications to be mediated through a mechanism that guarantees the behavior that a recipient of a parcel will be either located or started to receive the parcel. In the described embodiment, the agent to agent communication exists as communication between two agents on a single box. In other embodiments which support distributed systems, the VM can use routing information embedded in the (To) address to route the parcel to the appropriate remote or clustered system. An agent running on one coast could check to see if an agent for a user across the country wants to accept a call, and all the messaging could be happening across SS7 (Signaling System-7—a phone network) or some other wide area network without the need to do a call setup.

MMUI:

The MMUI multi-media user interface is a media-independent interface for communicating with users. The MMUI allows agents to focus on the content to be communicated rather than the format of the content and the details of using specific devices in presenting content.

The fundamental building block of the MMUI is an object referred to herein as a meme. A meme is a media-independent reference to a piece of information. The meme contains a set of media objects which store the information in a variety of different formats. A media object is a piece of information, such as a sound, text string, or DTMF sequence, that can be presented to a particular kind of communications device.

Agents use memes and menus as part of their dialogs with users. These dialogs can be part of a task or outside of a task, such as from a C++ method. For example, as part of a call task, an electronic assistant needs to ask the user who to call. Within a field of the call task is a "Call Whom?" meme, which the presenter gives to the active gadget. The "Call Whom?" meme consists of several different media objects:

for example, an audio recording for use on the telephone, or a text string for displaying on a computer monitor. The active gadget passes the meme to the VM, which selects the type of media based on the capabilities of the active gadget. For example, if the active gadget is a telephone, the VM selects the audio recording in the meme, and the user hears something like "Call Whom?".

The type of gadget is the primary factor but not the only factor that affects what type of media is used from a given meme. Users can set preferences for their electronic assistants, and system administrators and system integrators can set system-wide preferences that apply to all electronic assistants. For example, a user may select verbose prompts and a male voice for an electronic assistant. The system integrator may have set up the system with Spanish as the default language. These preferences are known as attributes in the MMUI. An attribute is a name/value pair. Typically, an attribute is used to tailor the behavior of an active gadget and of all MMUI elements.

When an electronic assistant obtains an active gadget from the VM, it sets the attributes on it. Later on in the session, when the electronic assistant sends memes to the gadget (in this example, as part of a task), the attributes and the type of gadget determine what media object in a meme is used. For example, in a bilingual voice system, memes may have two audio media objects: one with the information recorded in French, and another with it recorded in English. If the user had set the language attribute to French and the gender attribute to male in the previous example, the resulting prompt would be spoken in French with a male voice.

Another important building block in the MMUI is the midget. A midget is an object used for constructing a multimedia dialog. A midget in a multimedia user interface is analogous to a widget in a graphical user interface. The most common type of midget is a menu. Referring to FIG. 8, a menu 180 is a set of choices that can be presented to a user using multiple media. A menu consists of rows describing each choice (a meme 182) and columns describing the media 184 that can be used to present the meme in each row. An additional column optionally stores a pointer 186 to the referenced data object in the database e.g. a contact object. In some cases, columns are blank if it is not possible or appropriate to present the meme using that type of media.

In a typical dialog, the electronic assistant passes a meme and a menu to the active gadget. The meme is presented to the user, the user's response is matched against the rows in the menu, and the menu row selected (known as the menu pick) and the data pointer (if present) are returned to the electronic assistant. For example, in the case of the call task, the electronic assistant passes a meme for presenting the question "Call Whom?" and a menu containing the user's contact list. In this example, the MMUI menu has four columns. The first column contains the text spelling of the contact name; the second column contains a string describing the DTMF sequence that can be used as a shortcut for the contact name; the third column contains the vocabulary used for recognizing the spoken contact name; and the fourth column contains a pointer to the contact's information in the database.

Although this example menu has four columns, menus can have more columns to accommodate different attributes. For example, in a command menu, there could be verbose and terse versions of the spoken command or versions spoken in different languages.

Some menus contain additional objects, called moguls, attached to them for managing complex media types. A mogul is an object that manages a particular type of media. A mogul can store media-specific information. For example, an audio mogul is attached to the audio media column of a menu and stores the speech-recognition vocabulary to be downloaded on the recognizer hardware. A mogul can update the content of certain media in the memes in a menu when updates occur to other media in the memes. for example, a DTMF mogul updates DTMF media objects whenever their text media counterparts change. In FIG. 8, if the subscriber changes the spelling of Susan Schmidt to Susan Smith, the DTMF mogul would change "773" in column two of the menu to "776". Media that are updated by a mogul instead of created by the user are called mogul-generated media. DTMF media is an example of mogul-generated media.

The algorithm to generate DTMF for a name or command is as follows: DTMF commands are usually at least three digits. If there is one word, then map the first three letters to the corresponding telephone key that has those letters. If there are two words then map the first letter of the first word and use the two first letters of the second word. If there are three words then take the first letter of each word. In the case where three letters is not enough because the command is still not unique, then continue to take the first letter of subsequent words until you have a unique sequence.

Figure 9:
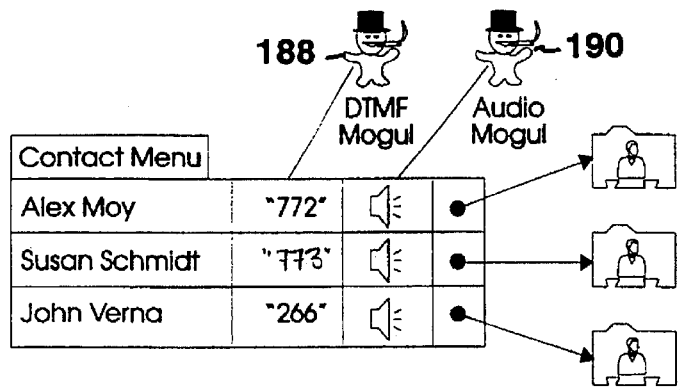
FIG. 9 shows a sample MMUI menu with moguls.

FIG. 9 shows the contact menu with the DTMF mogul 188 and audio mogul 190 attached to it. Moguls form a sort of third dimension to menus; they can be thought of as the depth of a menu.

Figure 10A:
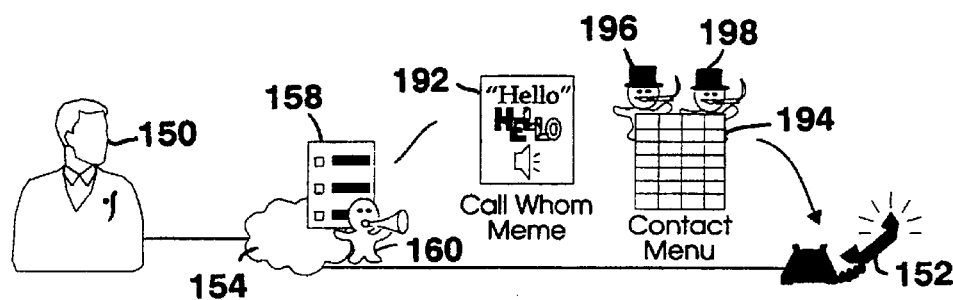
FIGS. 10A-D show the relationship between memes, menus and moguls.
Figure 10B:
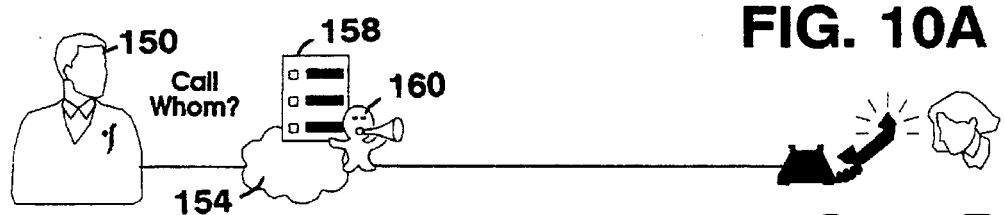
Figure 10C:
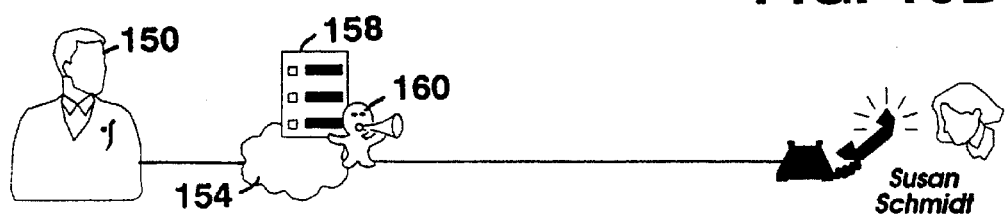
Figure 10D:
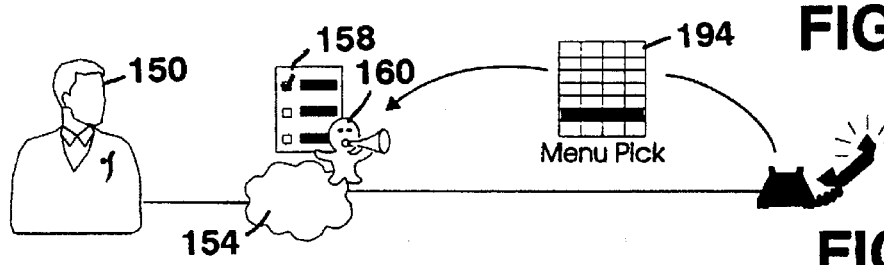

FIGS. 10A-D show the "Call Whom?" example previously discussed. First, the presenter 160 passes a meme 182 and a menu 194 to the active gadget 152 (FIG. 10A). The menu has two moguls attached to it: a DTMF mogul 196 and an audio mogul 198. When the VM receives the menu, it unpacks the vocabulary stored in the audio mogul and downloads it on the recognizer hardware. Since the active gadget is a telephone with speech recognition capabilities, the subscriber hears the electronic assistant say "Call Whom?" (FIG. 10B). When the subscriber responds with "Susan Schmidt" (FIG. 10C), the recognizer hardware uses the vocabulary to find a match in the contact menu and returns the menu pick to the electronic assistant (FIG. 10D).

Memes are often strung together in a meme list to form a complete statement. The agent or presenter can pass a single meme or a meme list to the active gadget. When a meme list is passed to the active gadget, the memes are played in the order in which they are listed.

Utility agents:

The parcel mechanism provides a way of communicating between agents and sessions. Utility agents carry out actions on behalf of the electronic assistant, such as delivering messages, scheduling reminders, and answering unassigned phone lines. There are several different types of utility agents including a postmaster agent, various courier agents, a cron agent and a secret agent.

The postmaster agent is an agent that receives messages from electronic assistants and distributes them to appropriate courier agents for delivery. The courier agents are agents that receive messages from the postmaster agent and deliver them to their destination. The message store is a portion of the object database containing the incoming and outgoing messages for all persons.

Figure 11:
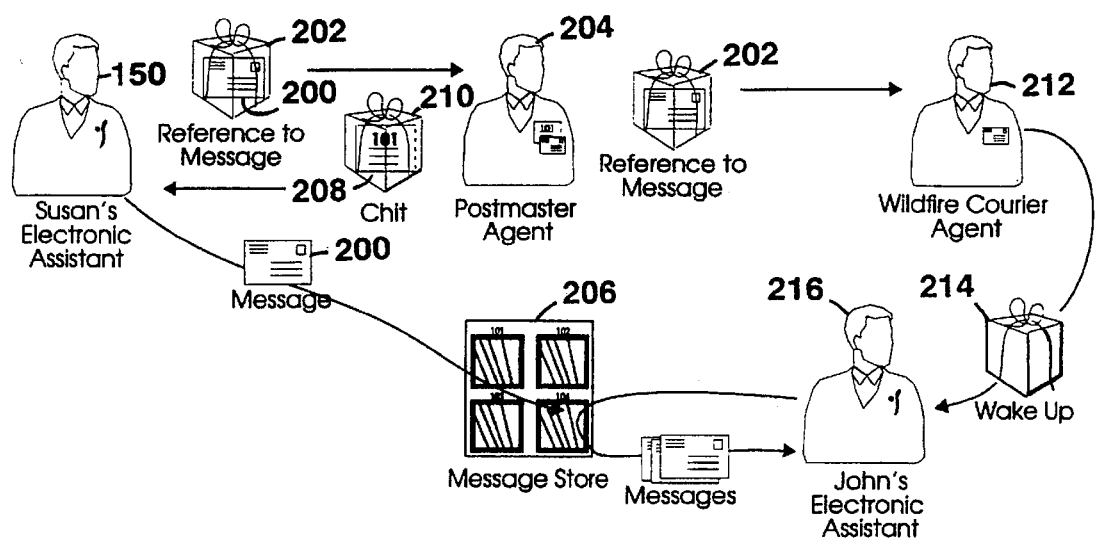
FIG. 11 illustrates the process of submitting and delivering a message and the objects that are involved.

Referring to FIG. 11, when Susan's electronic assistant 156 submits a message 200 for delivery, the parcel mechanism packages a reference to the message in a parcel 202 and sends it to a postmaster agent 204. The parcel mechanism also inserts the message into the appropriate user's section of the message store 206. In return, the postmaster agent 204 packages a chit 208 in a parcel 210 and sends it to the electronic assistant. A chit is a receipt issued by the postmaster agent, which an electronic assistant can use to check on the delivery status of the message.

As the postmaster agent receives messages for delivery, it selects the appropriate courier agent 212 that should deliver it. Different gadgets require different types of courier agents. For example, the system courier agent delivers messages for electronic assistants, and a SkyTel™ courier agent delivers messages to SkyTel pagers. When the postmaster agent gives a message to the system courier agent, it sends a "wake up" parcel 214 to John's electronic assistant 216 to notify it about the new message. The user's electronic assistant retrieves the message from the message store.

If the courier agent could not deliver the message, it returns the parcel containing the reference to the message back to the postmaster. Depending on the number of retries permitted for the message, the postmaster may ask the courier agent to retry the delivery or mark the delivery as failed.

Cron agent:

The cron agent is an agent that receives reminders from agents, tracks them until they are scheduled for delivery, and then delivers them to agents. The cron agent may also track other items. Therefore, the parcel can actually contain any database object, not just a reminder.

Figure 12:
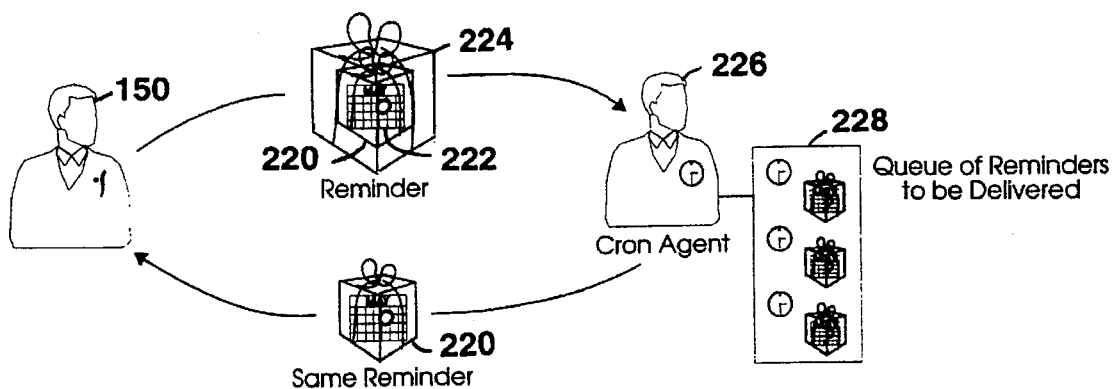
FIG. 12 illustrates the process of delivering reminders and the objects that are involved.

Referring to FIG. 12, when an electronic assistant 150 submits a reminder for delivery, it creates a parcel 220 containing a reminder 222, and the parcel is both from the user and to the user. Next, it takes this parcel and places it in another parcel 224, which is addressed to the cron agent from the user. This latter parcel is submitted to a cron agent 226. When the cron agent receives this parcel, it unpacks the parcel inside it. It then places the parcel in a queue 228 in time-sorted order with other parcels and keeps track of when this reminder should be delivered. When the time comes, sends this inner parcel back to the electronic assistant.

Object database

The object database is an object-oriented database, i.e., it is a database that maintains object structures and relationships directly rather than flattening them and reconstructing them. The object database stores all the information that both users and the system need across sessions. For example, if a user creates a new contact, the electronic assistant stores it in the object database. When the electronic assistant speaks to a user, it is using prerecorded media objects that are stored in the object database.

The object database stores a user's information using three different objects: a box object, a message store object and a user object. The box object and the message store were previously mentioned. The user object describes a subscriber or person.

Figure 13:
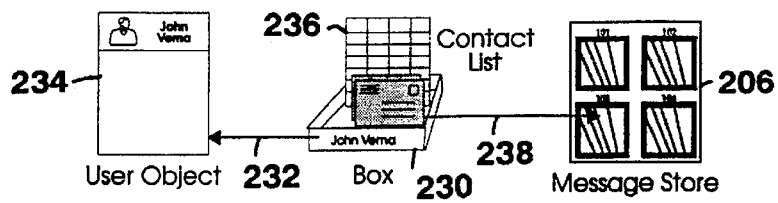
FIG. 13 shows the contents of a box.

Referring to FIG. 13, for each subscriber's assistant, the object database stores a box 230 containing: a pointer 232 to the user object 234 describing that subscriber; a contact list 236 which is a MMUI menu containing all of the user's contacts; and a pointer 238 to the section of the message store 206 containing the user's messages. The contact list is used with electronic assistant commands, such as "Call" and "Send Voice Mail", which expect the user to specify a contact.

A stored contact can also include a pointer to a note (e.g. a voice message) which the subscriber can generate and attach to the contact. When the subscriber instructs his electronic assistant to call the contact, the subscriber can also have the electronic assistant play back the attached note while the electronic assistant is attempting to establish the connection. The note might include information about the contact which the subscriber wishes to be reminded of whenever he calls that contact. For example, he may wish to know the name of contact's secretary so that he can address her by name if she answers the phone.

Figure 14:
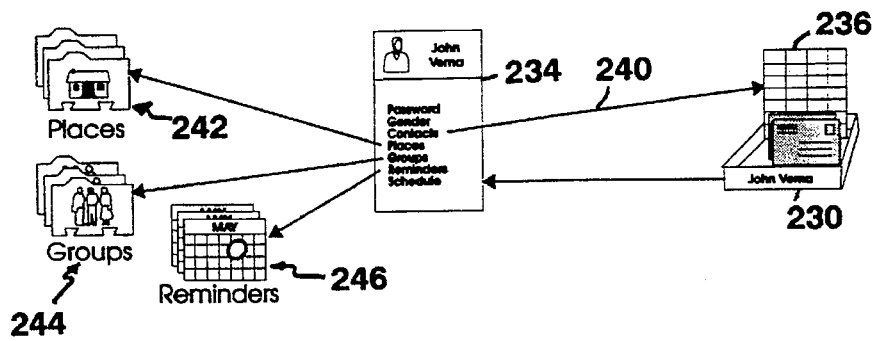
FIG. 14 shows the contents of a user object.

Referring to FIG. 14, the database maintains a single definition for each user in the system, which is known as a user object 234. The user object specifies the user's password, gender, and schedule. It also contains a pointer 240 to the contact list 236 in the box 230, a list of places 242 (i.e., home, work, car, mobile, other, pager), a list of groups 244 and a list of any reminders 246 that the subscriber has generated.

In the database, a person contact consists of a reference to a user object plus local information, such as the way the user pronounces the contact's name and a priority. Therefore, not only does the box point to a user object, but each person contact in the contact list in a box points to a user object. A group contact consists of a set of object IDs for user objects. A place contact consists of a phone gadget and fax gadget.

Figure 15:
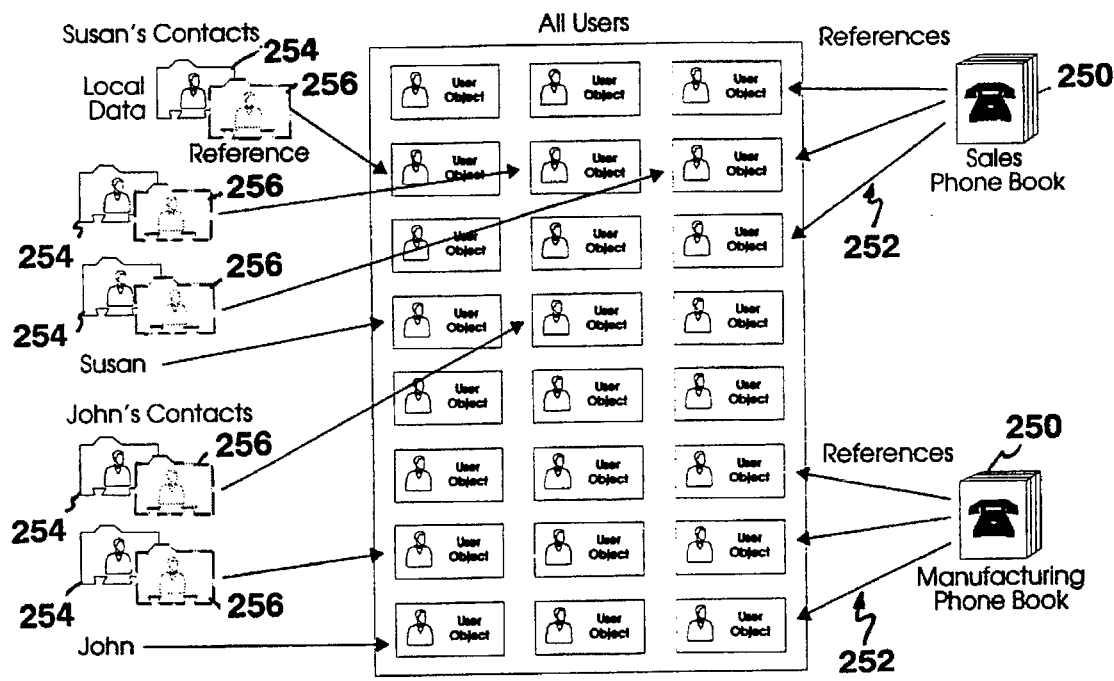
FIG. 15 shows the relationship between user objects and contacts.

Referring to FIG. 15, the object database also contains phone book objects 250. A phone book is a list of other subscribers on the system and consists of a set of pointers 252 to user objects. There may be one or more phone books, but any subscriber can access only one phone book. Each entry in a phone book is a reference to one of the user objects. Likewise, a user's contact 254 consists of a reference 256 to a user object plus some local information.

When a user changes the portion of a contact that is stored in the user object, such as the work or home phone number, all phone books and contacts referencing that user object show the new information.

For every user item, the object database also keeps general information necessary for accessing that item. This information includes the object ID, object label, owner, time of last modification, time of last access, and time of last change to ownership. The object label is a meme that can include the spoken and spelled names of the item. Each item also has a set of associated flags, such as read, unread, important, and not important.

Virtual Machine

The Virtual Machine (VM) is the system's operating system, it is a process that allocates and manages system resources for agents and assistants. The VM responds to requests from agent sessions (just as an operating system responds to system calls) and events generated by the hardware. In essence, the VM is a large event processor. The VM initiates all I/O operations, including input (recording memes), output (playing memes), and recognition (recognizing speech or DTMF). In addition, the VM initiates connections to gadgets, disconnects connections to gadgets, and handles incoming connections.

Figure 16:
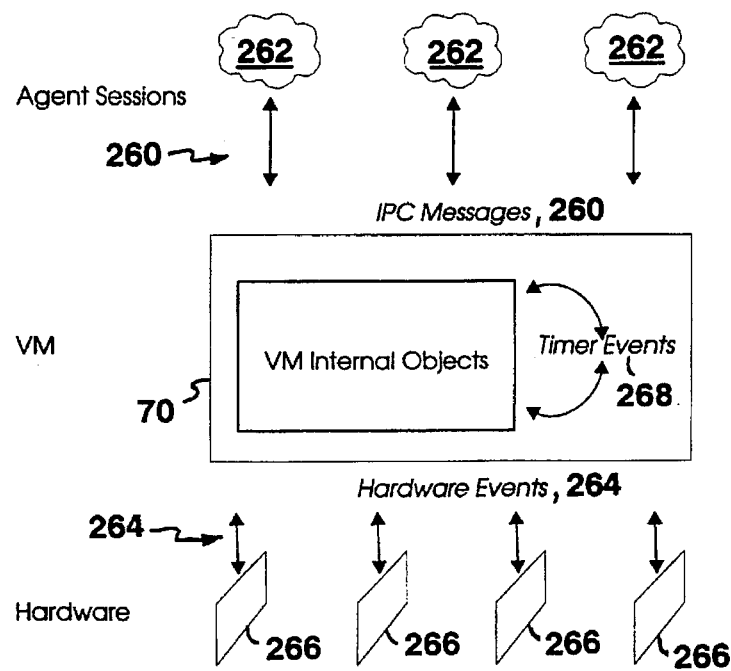
FIG. 16 shows the flow of events between the VM and the agent sessions and hardware.

Handling events:

Referring to FIG. 16, the VM 70 responds to three kinds of events: interprocess communication (IPC) messages 260 from agent sessions 262; hardware events 264 from the communications cards and other hardware 266; and timer events 268 from its internal time queue.

Each action taken by an agent results in an IPC message to the VM. The VM receives this "event" and carries out the request. The VM may send IPC messages back to the agent session to communicate with it. The VM transmits parcels using IPC messages. For example, when an agent sends a parcel to another agent, the first agent sends an IPC message to the VM, and as a result, the VM forwards the IPC message on to the second agent.

Output to and input from the hardware causes a hardware event. For example, when a caller begins speaking a hardware event occurs.

Objects internal to the VM can set timeouts as part of handling other events. These events are placed on a time queue, and when the time expires, a timer event occurs that the VM handles like any other event. For example, when a user is pressing DTMF tones, a timer goes off if there is a long pause between tones.

The VM must handle events quickly and efficiently to provide fast response time to agent requests. The VM listens for events and when one occurs, it blocks all other activity and responds to it. When it finishes handling an event, it listens for the next event.

Figure 17:
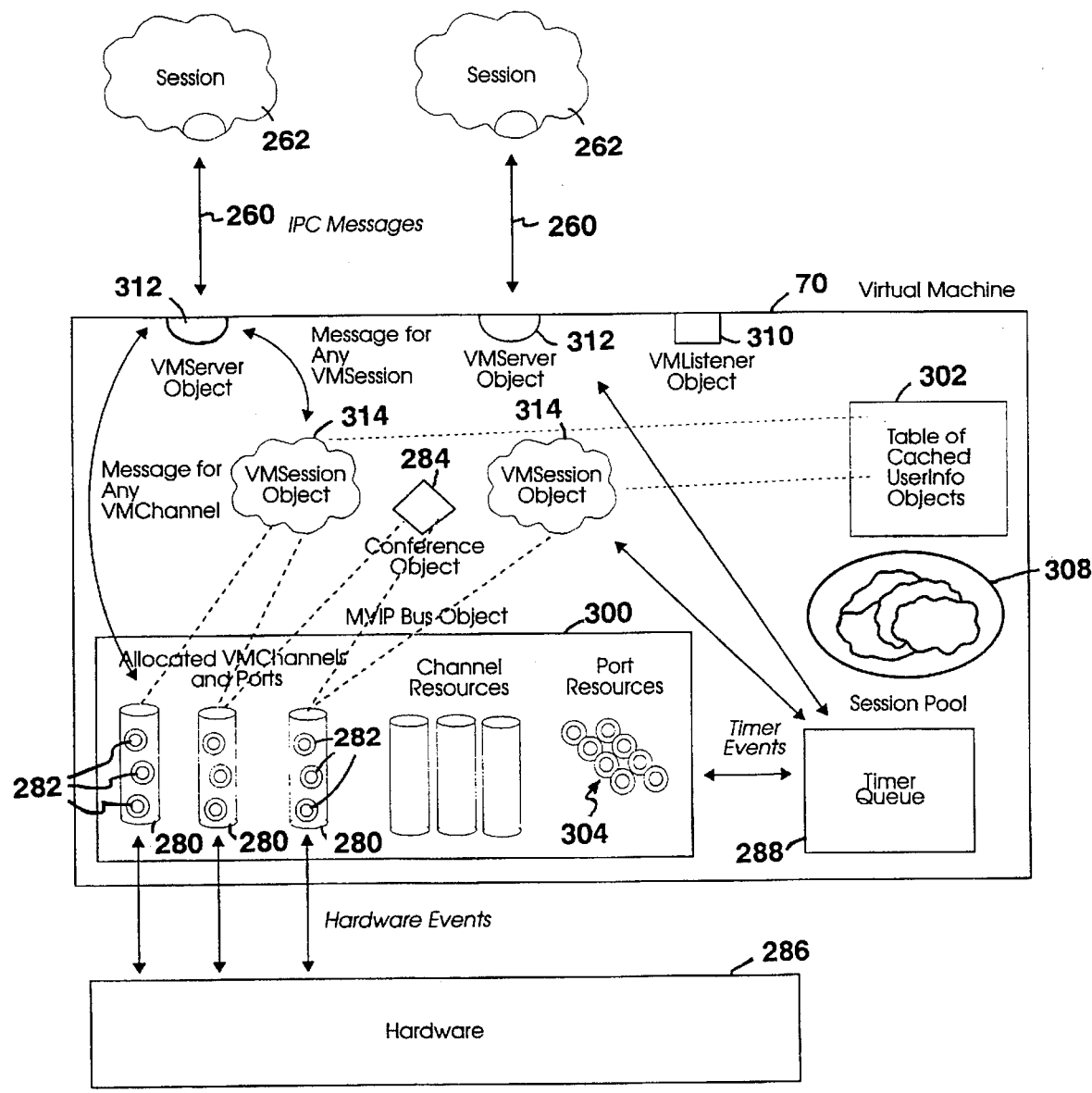
FIG. 17 shows the VM internal objects and their relationship to each other.

After the VM creates a session, the session sends an IPC connection request to the VM. A VMListener object 310 in the VM receives this connection request, and the VM creates a VMServer object 312 for that session to use in communicating with the VM. It is the VMServer object that receives the IPC messages from the agent's session, as shown in FIG. 17. The VMServer object takes the object ID and performs an algorithm on it to obtain the appropriate IPC target (VMSession 314 or VMChannel 280) in the VM. The VMServer object then passes on the message to the right VMSession or VMChannel. To do so, the VMServer calls the RPC target's do_rpc virtual member function, and the RPC target processes the message and carries out the operation.

Each agent session has a corresponding VMSession object 314 in the VM. The VMSession object stores the current state of the session. This object also queues parcels destined for the agent when there is no session running for the agent. Once a session is running again, it sends the parcels.

Any VM object can create a Timer object to set a timeout. The VM stores Timer objects on its timer queue 288, and when the timer goes off, a timer event occurs, which the VM handles like any other event.

Managing resources

The VM manages several kinds of resources: those that can be directly manipulated by agents, those that can be indirectly manipulated by agents, and those internal to the VM. FIG. 17 shows these resources in the VM where there are two active agent sessions and a conference between the sessions.

Agents can directly manipulate sessions, channels, conferences, and parcels. For each agent session, the VM maintains a communications channel for IPC messages and an object that keeps track of the state of the session.

Each active gadget in an agent session corresponds to a channel 280 in the VM. As previously noted, a channel can have a set of ports 282 attached to it, with each port providing one or more capabilities. A capability is a representation of an ability or feature or a channel, such as the ability to recognize speech or play audio. Agents request capabilities from the VM in order to communicate with their users. In response, the channel attaches one or more ports, where each capability corresponds to one or more ports.

A conference 284 is an object that can connect multiple channels in a single session or in multiple sessions. For example, to arrange a conference call, an electronic assistant places calls to each participant and then uses a conference object to connect the participants' channels into a single session.

For each parcel sent by an agent, the VM transmits it and if necessary, queues it.

Through the manipulation of capabilities agents can indirectly manipulate ports. A port is an object referring to an input/output device. A channel creates one or more ports for each capability requested by the electronic assistant and manages the ports throughout the connection. The port connects to the hardware device 286 that actually has the capability. Ports can also be thought of as filters. For example, a speech recognition port is not an audio port; it takes audio and then converts it (i.e., filters it) to a menu selection.

The VM also has internal resources including timers 288, a bus 300, and user info objects 302. A timer is an object that represents a timeout. For example, a timer object is set for the time between DTMF keys and the time between retrieving a parcel and actually receiving it. A bus is an object that represents a data and control hardware bus, such as an MVIP bus or a TCP/IP bus. All objects connected to the bus can communicate with each other using the same protocol. A user info object is a cached pointer to the User object in the object database. A user info object is created for each user that calls their assistants and logs in.

The VM allocates and deallocates sessions as they are needed. When an incoming call arrives or a parcel is delivered to a user that does not already have a master session, the VM starts a new session.

A resource manager in the VM performs resource management functions. For example, it keeps a pool of free and available recognizers and interactive-in and interactive-out resources 304. It manages the assignment and deallocation of these resources and it notifies requesters when resources (e.g. channels) are not available. It also holds onto reservations for resources when they are not currently available and as soon as a requested resource becomes available, it assigns that resource to the requesting session. It also deallocates the interactive-in and interactive-out ports and recognition ports when they are no longer needed for a channel, freeing them up for use by other channels.

Conference Objects:

Conference objects are used by an agent and the VM to connect together multiple gadgets and their respective channels. The agent and the VM have slightly different views of a conference object. The agents see only the active gadgets that the agent is in control of; while the VM sees all the active gadgets and their respective channels that are connected into a conference.

The methods on conference objects are listed and described in the following table.

| Method | Description |
| --- | --- |
| Add | This is used to add an active gadget or a gadget into the conference. When a gadget is added, an active gadget is returned. |
| Remove | This removes an active gadget from a conference. |
| SwitchOut | This switches an active gadget out of the communications paths for the conference. The gadget remains part of the conference but it is not connected to the streams of communication with other participants. This allows an agent to carry on a dialog with a specific active gadget without other participants of the conference hearing. |
| SwitchIn | This is the complement of SwitchOut. It switches a switched-out active gadget back into the media streams of the conference from which the active gadget had previously been removed. |
| CreateConference | This creates a new conference. |
| ChangeConference | All conference operations work on a current active conference. ChangeConference changes the active conference. |
| DestroyConference | This destroys a conference and deallocates all resources associated with that conference. |

In the described embodiment, active gadgets are always connected to a conference object. In the case that there is only one active gadget, such as when a subscriber or in caller are conversing with an electronic assistant, then the active gadget is connected to a special form of conference called the idle conference.

Allocating Channels and Ports:

To speed up the allocation of sessions, the VM keeps a session pool 308 containing sessions that are not yet assigned to users. As noted earlier, the electronic assistant handles an incoming caller using a new session. The VM allocated this session from its session pool. The VM creates the session pool at system startup time and refills it as necessary. Each session in the pool is for a specific type of agent.

The VM also maintains channel resources, which are pools of channels or ports that the VM can allocate to active gadgets. The channel resource or port resource is responsible for managing the allocations and deallocations from its pool.

In the described embodiment, upon start up of the system, the VM constructs the channels that are necessary to handle communications through the interfaces supported by the system. The channels which are constructed have three possible modes: a listen mode, an idle mode, or an outgoing call mode. In the listen mode, the associated interface card is monitoring the incoming line (e.g. the T1 line) for incoming calls. In the outgoing mode, the interface card is set up to initiate a connection to its communications channel. Idle mode is used during transitions. Upon start up, all of the channels that are constructed are put into a listen mode, ready to receive an incoming call.

As illustrated in FIGS. 18A–B, when an agent 150 adds a gadget 336 to a session, the VM gets a channel 280 (FIG. 18A), makes a connection on the channel, and creates an active gadget 152 (FIG. 18B) that refers to the channel. The channel represents the actual connection used to communicate with the user.

Agents can add input, output, and recognition capabilities to gadgets, and the VM attaches ports with those capabilities to the channel. There are three types of ports: input ports, output ports, and recognition ports. An input port records audio into a meme. An output port plays audio from a meme. A recognition port uses input from the user to make a selection from a menu.

Each port represents a capability of a physical device, such as a line processing card or a voice recognition interface card. When the VM attaches ports for a given capability, it usually attaches more than one port. For example, in the described embodiment when an agent requests the recognition capability, the VM adds a voice recognition port for recognizing speech and a DTMF recognition port for recognizing DTMF tones. When the agent requests the output capability, the VM adds multiple output ports, with each port handling a different audio format. This allows transparent support for hardware which uses different audio formats.

Presenting Memes and Menus:

When the agent prompts the user with memes and menus, each port responds to the media or mogul that it knows how to play or recognize. For example, the output port plays any audio media for system prompts, while the recognize port performs speech recognition to determine the user's selection from a menu. For each channel, only one type of media is presented from each meme. When presenting memes, only one output port can present a meme at a time. When analyzing a response, however, multiple recognition ports can be listening at the same time; for example, one can be listening for speech and the other for DTMF tones. If DTMF tones occur, the DTMF recognition port cancels the speech recognition port that was listening for speech. Likewise, if speech occurs first, it cancels the DTMF recognition port.

For example, consider the "Call Whom?" meme previously discussed. Referring to FIG. 19, when the presenter 160 passes the "Call Whom" meme 192 and contact menu 194 to the active gadget 152, the VM presents the meme to the collection of ports 282 attached to the channel 280. The audio output port knows how to play this meme, so it takes the meme and plays it. Next, the VM presents the menu to the collection of ports attached to the channel. Both the DTMF and VPC recognition ports know how to use this menu, so they take it and begin listening for DTMF tones or speech (respectively). Once the VPC recognition port detects speech, it cancels the DTMF recognition port, matches the speech against the menu, and returns the menu pick to the presenter.

When the VM presents a meme list to a collection of ports, each output port looks at the first meme in the list and any successive memes that have the same audio format. If an output port can play the memes, it removes them from the meme list, plays the memes in sequence, and returns the remainder of the list to the VM. The VM presents the remainder of the list to the ports again, and the process continues as before until there are no memes left on the meme list.

Switching channels

The VM is also responsible for connecting and switching calls. It keeps track of all connections between gadgets and it uses the conference object to connect and switch calls. A conference object can connect multiple channels into a single session. For example, to arrange a conference call, an electronic assistant places calls to each participant and then uses the conference object to connect the participants' channels into a single session.

Detailed Architecture and Internal Design of Agents

Figure 20:
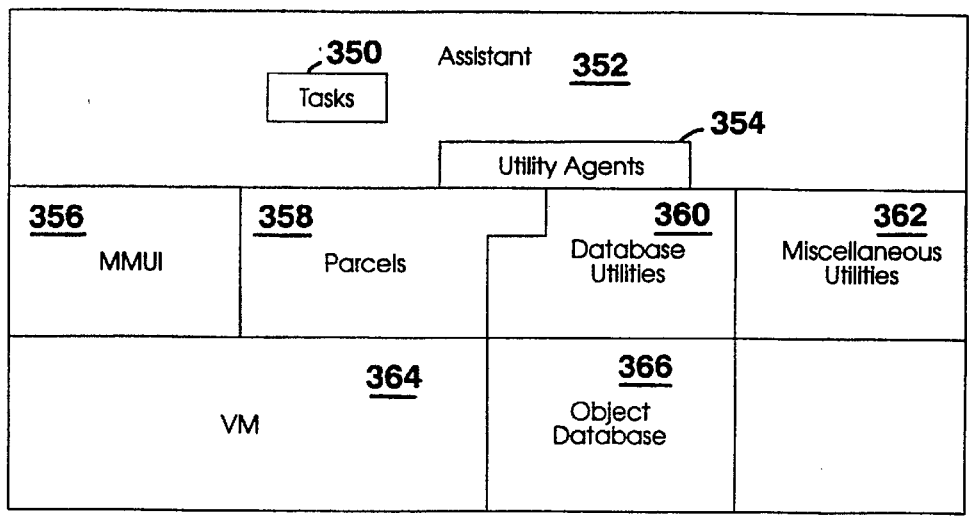
FIG. 20 shows the functional relationships between the agents and the applications services.

The system agents use a variety of application services to carry out its duties. FIG. 20 shows the functional relationships between the agents and these application services.

Tasks 350 are part of an assistant layer 352 but are not used by the utility agents 354. The assistant uses the MMUI 356, parcels 358, database utilities 360, and miscellaneous utilities 362, which in turn depend on the VM 364 and object database 366. Database utilities are a set of macros for accessing the database, while miscellaneous utilities are a set of standard data structures and containers (such as strings and bit arrays). The utility agents use parcels and database utilities and other VM services (e.g. access to channels, gadgets and active gadgets) carry out their duties. The parcel mechanism is layered on top of both the VM and the database utilities. Although the functional diagram shows the agents relationship with the rest of the architecture, it does not show the dynamics of a live session.

Figure 21:
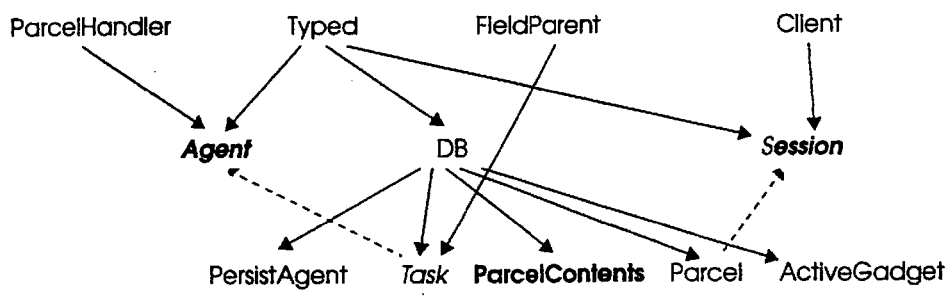
FIG. 21 shows the flow of data in an assistant's session.

FIG. 21 shows a sample assistant session. At the bottom of the session, the MMUI, VM and parcel libraries 368, 370 and 372 are linked in. The active gadget 374, which the assistant uses to communicate with the user, is layered directly on top of the channel 376 itself. When the assistant takes a task 377 off the task list 378, the task and presenter 380 may pass menus 382 and memes 384 to the active channel or send parcels. In either case, the VM library sends an IPC message 386 to the VM, and the VM carries out the action. As part of carrying out the assistant's actions, the VM may send IPC messages back to the session. The VM library converts these messages back to the objects familiar to the assistant. The task may return menu picks, memes, and parcels to the assistant.

As noted earlier, conceptually, there are three kinds of agents, namely, agents, user agents, and assistants. In the class hierarchy, however, only agents and assistants have classes; user agents do not have a class.

Figure 22:
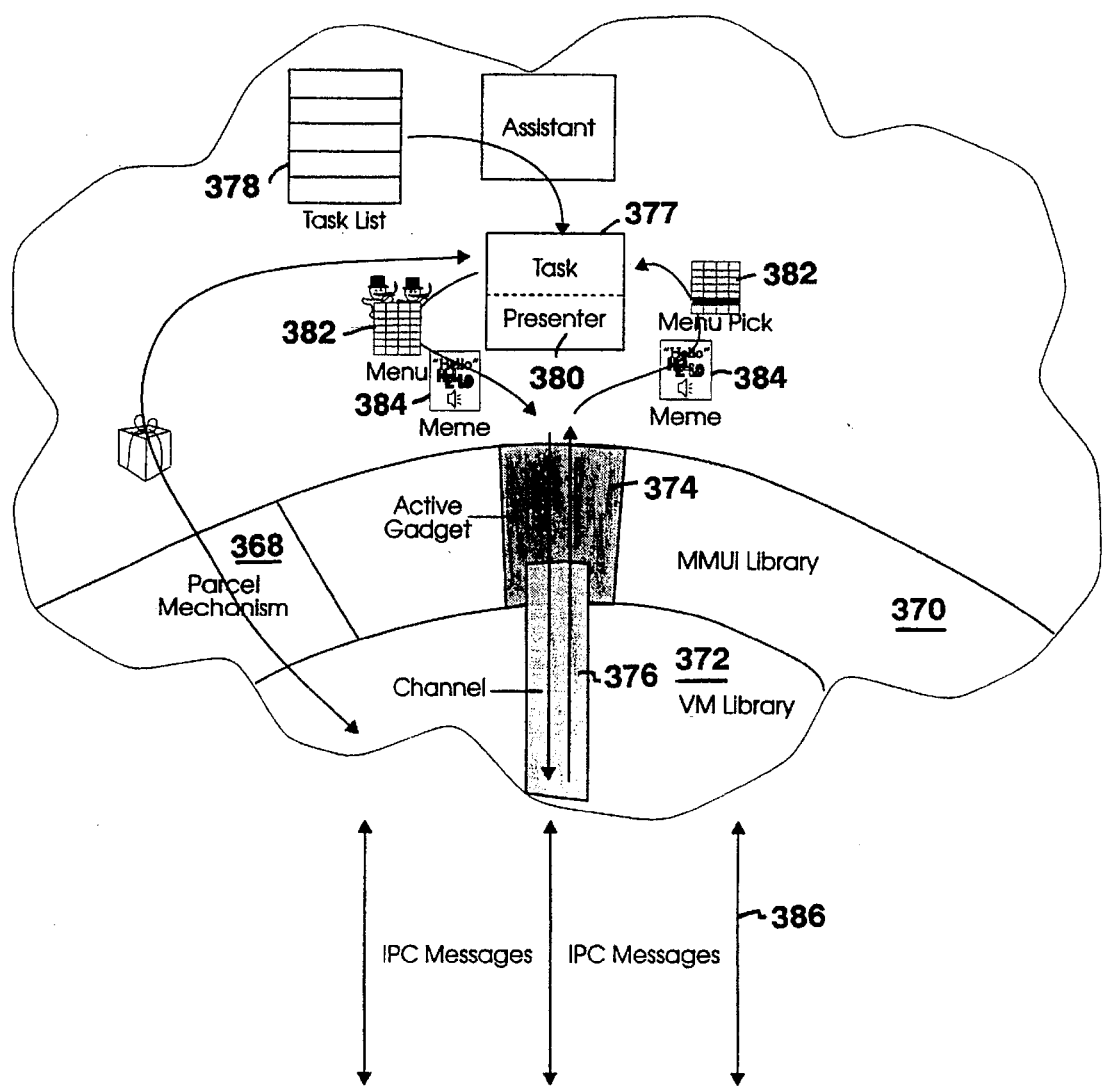
FIG. 22 shows the agent class hierarchy.

The Agent class 398 is the base class for all agents and assistants. FIG. 22 shows the Agent class and other closely related classes, including, Session, ActiveGadget, Parcel, and Task classes. Also, there is a PersistAgent class, which holds the persistent data for an agent. (In FIG. 22, solid lines represent subclasses and dashed lines represent friend classes.)

Generally, the most important operations that are carried out by an agent are performed on the Session, Agent, or ActiveGadget, as outlined in Table 3.

TABLE 3

| Class | Operations Performed |
| --- | --- |
| Session | Manipulating gadgets |
|  | Handling parcels |
| Agent | Handling tasks |
|  | Handling contents of parcels |
| ActiveGadget | Presentation of prompts |
|  | Collection of responses |
|  | Manipulating capabilities |
|  | Training |

The following subsections describe SessionAgent, ActiveGadget, PersistAgent, Task, Parcel, and ParcelContents classes in more detail.

The Session Class:

The Session class is a subclass of the Client class, which provides it with the capability of being an RPC client in the VM. The session provides the thread of execution for the agent and keeps track of the Interprocess Communication (IPC) connection to the vmserver process.

The Session class consists of the following data members:
  A socket, which is used for communicating with the vmserver process (inherited from Client class)
  An object ID (inherited from Client class)
  A pointer to itself (inherited from Client class)
  A reference to the user object
  A pointer to the focus gadget
  A list of gadgets
  A list of parcels The Session class contains member functions for:
  Managing gadgets. The set includes functions for adding, removing, and connecting gadgets and getting and setting the focus gadget.
  Handling parcels. The set includes functions for sending parcels, retrieving parcels, replying to parcels, and queueing parcels.
  Making a master session out of the current session.

The Agent class:

The Agent class is a subclass of both the Typed and ParcelHandler classes. The Typed class is the primary base class. It provides run-time checking and member functions for downcasting objects. The ParcelHandler class is a base dispatcher class for handling parcels and gives agents the ability to communicate with one another using parcels.

The Agent class consists of the following data members:
  A name (inherited from Typed)
  A type ID (inherited from Typed)
  A pointer to the session (inherited from ParcelHandler)
  A timeout (inherited from ParcelHandler)
  A task stack, which contains a linked list of task objects to be executed by the agent
  A pointer to the active gadget
  A pointer to the persistent agent The Agent class contains member functions for:
  Handling tasks. This set includes functions for adding tasks, removing tasks, getting the next task from the task stack, performing a task, executing a task, and cancelling a task.
  Returning the active gadget and persistent agent.
  Handling each type of parcel contents (ParcelContents class). These member functions are inherited from the ParcelHandler class.

Each subclass of Agent contains any objects belonging to that type of agent. For example, the subclass for the assistant contains the hand and hand history, while the subclass for the courier agent contains the list of parcels to be delivered. In addition, each subclass of Agent contains methods for all actions carried out by the agent that are not tasks.

All agents follow the same basic skeleton of operations. Specifically, an agent carries out the following operations in its main processing loop:
  Creates a session
  Creates an agent session within the session
  Enters the perform method to perform tasks
  Continues performing tasks until there are no more tasks or an exception is received
  Deletes its session
  Exits The Agent::perform() method gets the next task on the task stack and performs it until there are no more tasks on the task stack. Utility agents, such as the cron agent and postmaster agent, however, do not use the task stack or tasks. Each utility agent knows how to handle a single type of parcel, so it provides its own perform() method that waits to receive a parcel and then services it.

The main routine for a complex agent, such as the electronic assistant, has the basic operations just presented, but includes many additional operations, such as ones for initializing the memes in the database, looking up the slot of the vmserver process, looking up the subscriber to which it belongs, getting the focus gadget, and so on.

The ActiveGadget class:

The ActiveGadget class is derived from the DB (database) class, although it is not actually stored in the database currently. The DB class is the primary subclass of Typed and it contains all of the objects stored in the database. The ActiveGadget class consists of the following data members:
  A pointer to the channel in the VM
  A pointer to the meme list
  A pointer to a menu The ActiveGadget class contains member functions for:
  Presenting a meme and collecting a response from a menu.
  Adding and removing capabilities.
  Training utterances. The set includes functions for starting training, collecting utterances, adding training, completing training and aborting training.

The ActiveGadget class defines operators for:
  Presenting information to the user (<<)
  Recording information from the user (>>)

Gadgets store the "address" at which a user can be reached. There are the following types of gadgets:
  PhoneGadget, which describes the address of a telephone—the prefix, country code, city code, area code, number, and extension.
  AgentGadget, which describes the address of an assistant—a pointer to its subscriber's user object.
  ArdisGadget, which describes the address of an Ardis pager.
  SkyTel PagerGadget, which describes the address of a SkyTel pager—a pager ID and security ID.

NumericPagerGadget, which describe the address of a numeric pager—a phone number.

SocketGadget, which describes the address of a data network—a hostname, service, and service type.

Theoretically, any agent can use any type of gadget. Certain agents, such as the courier agents, are specialized to deal with particular kinds of gadgets. For example, the system courier agent knows how to deal with the AgentGadget, while the Skytel courier agent and Numeric Pager courier agent know how to deal with the SkyTel PagerGadget and NumericPagerGadget respectively.

To use a gadget to communicate with a user, an agent adds it to the session to obtain an active gadget. Then, the agent can send and receive information over the active gadget.

The PersistAgent class:

The PersistAgent class has no data members or member functions. Each subclass of PersistAgent provides data members for its agent's persistent data and member functions for accessing the data. For example, the persistent assistant contains the subscriber's box, while the persistent cron agent contains a list of cron events.

The Task class:

The Task class is derived from the both the DB class and the FieldParent class. The FieldParent class gives a task a way of knowing whether it is changed, completed, or cancelled.

The Task class consists of the following data members:

What has changed (inherited from FieldParent)

Whether the task is complete (inherited from FieldParent)

Whether the task has been cancelled (inherited from FieldParent)

A pointer to the agent

A pointer to the active gadget

A pointer to the session

The Task class contains member functions for:

Processing executing, and cancelling tasks. These functions are protected and accessed only by the Agent class.

Returning and setting the active gadget.

Returning and setting the agent.

Returning and setting the session.

Each subclass of Task contains protected member functions for processing and executing that task.

The Parcel class:

The Parcel class is derived from the DB class and has the following data members:

The address of the recipient

The address of the sender

A parcel ID

A message ID

A reference to the contents of the parcel

The Parcel class has member functions for accessing data members of the class. It also has operators for:

Filling an RPC output buffer with the parcel (<<).

Removing a parcel from an RPC input buffer (>>)

The ParcelContents class:

The ParcelContents class is derived from the DB class, and is an abstract class. The ParcelContents class contains no data members and a single member function for processing the contents of a parcel.

Each subclass of ParcelContents contains data members appropriate for the parcel type, such as a reminder or even another parcel. Each subclass also has a member function for processing its particular content.

Setting up the focus gadget:

The focus gadget is a specific active gadget that an assistant must use to communicate with a user. In the case of a phone gadget, the focus gadget has speech-recognition resources associated with it.

When the VM starts a session for an incoming call, it equips the session with a focus gadget, Focus, which is a data member of Session. For phone calls, this focus gadget is of type PhoneGadget. The assistant uses this focus gadget to communicate with the subscriber, contact, or non-contact that is calling. Before the assistant can use the focus gadget supplied with the session, it must take the following actions to set it up:

1. Obtain the focus gadget with the get_focus member function.
2. Set any attributes needed on the focus gadget.
3. Add any necessary capabilities to the focus gadget.
4. Answer the call on the focus gadget.

In the case where a session is started because of a parcel delivery, the VM does not create a focus gadget. In this situation, the assistant attempts to locate and notify the subscriber by making an outgoing call. Before the assistant can communicate with the person being called, it must take the following actions to set up a focus gadget:

1. Determine the gadget that corresponds to the subscriber's location.
2. Obtain a focus gadget by adding the gadget to the session.
3. Set any attributes needed on the focus gadget.
4. Add any necessary capabilities to the focus gadget.

Once the focus gadget is set up, the assistant can communicate with the user using memes and menus and manipulate the gadgets as necessary to make additional calls, place users on hold, and connect users.

Obtaining additional active gadgets:

Theoretically, agents can add any gadget to a session with the Session:add(Gadget) member function. When the agent adds the gadget, it receives an active gadget in return, and the focus is already set to that active gadget, making it the focus gadget.

Each standard place (home, work, car, mobile, other) for each contact is represented by an addressable gadget object (e.g.a PhoneGadget object) that can be added to a session. For example, if a subscriber asks the assistant to place an outgoing phone call to a contact, the assistant obtains the phone gadget for the correct place (such as work), and adds it to the session.

When the agent adds a gadget to a session, the VM obtains a phone line and dials the number specified in the gadget. The VM does not create an active gadget and give it to the agent until the call connects successfully. The criteria for successful connection is variable; it can mean the phone rang several times or that someone answered the phone. If the call fails to connect, the VM does not create an active gadget, and add operation fails for the agent.

Setting attributes and capabilities:

Before the agent communicates over the active gadget, it must set any attributes and capabilities that it needs for communicating with the user.

Attributes specify which media get presented in a meme and can be thought of as properties of MMUI objects. The language and type of prompts (brief, dialog, instructional) used by the assistant are examples of attributes. Most attributes are set as part of the user preferences mechanism in the assistant. When the assistant starts up, it sets attributes on the focus gadget for each user preference. Whenever the user changes a preference, the assistant sets the appropriate attribute.

The VM currently provides the following set of capabilities:

WfInterOutCap, which provides audio output

WfInterInCap, which provides audio output

WfRecognizerCap, which provides speech and DTMF recognition

WfFaxInCap, which provides fax input

WfFaxOutCap, which provides fax output

WfAllCaps, which provides all capabilities

The assistant can set capabilities when it sets up the focus gadget or anytime during the session with the user. For example, if the user asks to fax some information, the agent can add the fax capability to the active gadget for carrying out that user request.

Answering the focus gadget:

For incoming calls, the assistant must answer the focus gadget with the ActiveGadget::answer member function, which picks up the call and stops the ring tone. After the assistant answers the call, it can begin communicating with the user or callee (e.g. it could be a fax machine that called).

Connecting gadgets:

Agents can connect, disconnect, and reconnect gadgets as needed during a session. To connect gadgets that are located in separate sessions, agents use a separate object, the Conference object. Once a connection is established, agents can disconnect and reconnect gadgets to place users on hold and connect them back in.

Parcels:

Agents use parcels to communicate with one another. A parcel consists of a target (addressee), which can be a user or a session, and content (ParcelContents class). Parcels are delivered to the addressee's session. If the addressee is an agent that can have more than one session running, the parcel is always delivered to the master session.

Table 5 describes the parcels that are used by agents.

| ParcelContents | Description | Sending or Receiving Agents |
|---|---|---|
| | Parcel/Contents Types | |
| ConnectParcel | Contains the caller requesting a connection and their name recording, a conference object, and the response from the callee and the caller. The assistant uses this parcel to negotiate connections between incoming callers and subscribers. | Assistant |
| CourierEvent | Contains a bond to the message to send, the list of addressees to which to send the message, and the number of retries left. The Postmaster agent uses this parcel to submit messages to courier agents for delivery. | Postmaster agent, SkyTel courier agent, system courier agent |
| CronEvent | Contains a parcel to be delivered and the time at which it should be delivered. The assistant uses this parcel to submit reminders (or any other items that need delivery at a specific time) to the Cron agent. | Assistant, Cron agent |
| MSFEvent | Contains a bond to a message. The assistant uses this parcel to submit messages to the Postmaster agent for delivery. | Assistant, Postmaster agent |
| NewMailEvent | The courier agents uses this parcel to indicate to the assistant that they have just delivered a message. | Assistant, system courier agent, SkyTel courier agent, Secret agent |
| PostalEvent | Contains a bond to the message to send, the list of addresses to which to send the message, and the number of retries left. Courier agents use this parcel to request that the Postmaster retry delivery of a message. | Postmaster agent, SkyTel Courier agent |
| ReminderEvent | Contains a reminder. The assistant uses this parcel to package up a reminder. | Assistant |

Assembling parcels

To assemble a parcel, the agent uses the Parcel constructor and specifies the ParcelContents class as an argument. The agent can then fill in the appropriate fields in the parcel's contents.

Sending and receiving parcels

To send a parcel, reply to a parcel or retrieve a parcel, the Session class provides the following member functions:

send_parcel reply_to_parcel retrieve_parcel

When replying to a parcel, the VM automatically addresses the parcel to a specific session rather than a specific addressee.

Figure 23A:
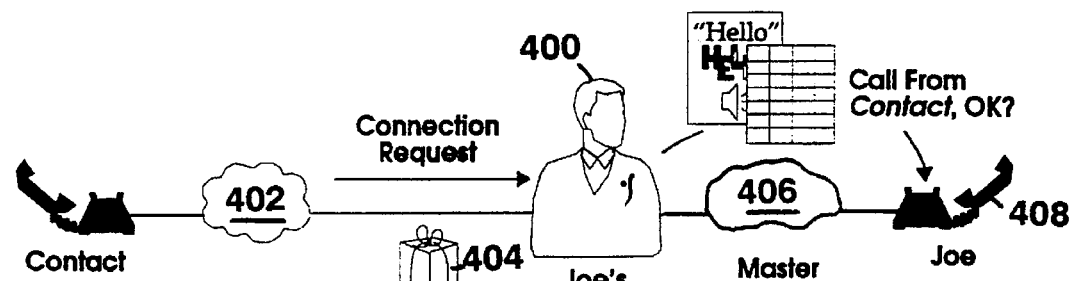
FIGS. 23A-D present an example of a three-part handshake.

Passing the same parcel back and forth:

Agents can pass a parcel back and forth, amending its contents each time, as a means of negotiation. As an example of using parcels in this manner, consider how the assistant handles calls. When a subscriber calls a contact, there is no negotiation involved in connecting the telephone call. There is a three-part handshake involved in connecting a contact to a subscriber in the following two situations:

An outside contact calls a subscriber;

A contact that happens to be a subscriber calls another subscriber who is logged into the system Referring to FIGS. 23A–D, the three-part handshake involves the following steps:

1. When a contact calls a subscriber, the electronic assistant 400 for the contact's session 402 sends a connect parcel 404 to the master session 406 (FIG. 23A). The parcel indicates that the caller is requesting a connection to the subscriber and contains a reference to the contact (or a dummy contact if the caller is not a known contact). If there is no master session, the VM starts one.

Figure 23B:
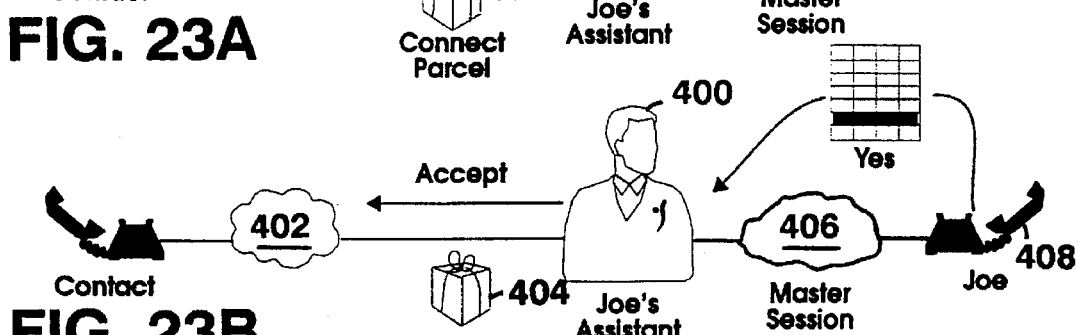

2. When the electronic assistant for the master session 406 receives the connect parcel 404, it checks to see if it has the focus gadget 408, which indicates it already has a session running with the subscriber. If the electronic assistant does not have the focus gadget, it means that the session was started because it received a parcel, and it needs to try to locate and notify the subscriber in order to get the focus gadget. Once the electronic assistant has the focus gadget, it asks the subscriber whether or not to connect to the contact. If the subscriber says yes, the electronic assistant for the master session sends back the connect parcel 404 and indicates within it that the connection request has been accepted (FIG. 23B).

Figure 23C:
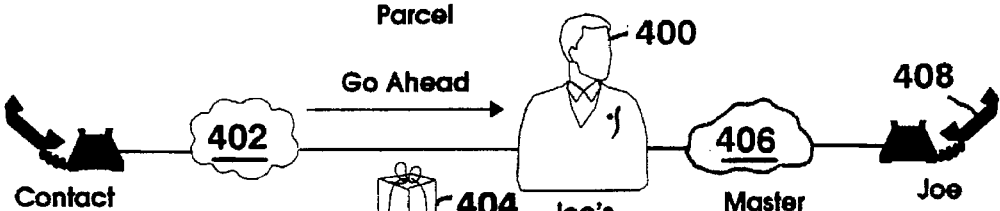
Figure 23D:
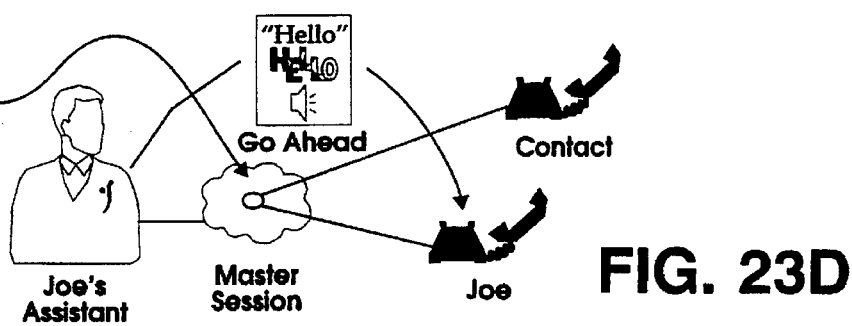

3. When the electronic assistant for the contact's session receives the connect parcel, it sends it back with the indication to go ahead and make the connection (FIG. 23C). When the electronic assistant for the master session receives the connect parcel, it connects the two gadgets and moves the contact's active gadget into the master session (FIG. 23D).

The way in which conference objects are used handling communications is illustrated in FIGS. 25A–D, which diagram the steps in creating a conference object for establishing a call from one subscriber to another subscriber. In this example, it is assumed that both subscribers are initially interacting only with their electronic assistants and thus are connected to idle conference objects. This is illustrated in session A by a focus gadget 401a connected to an idle conference object 403a and in session B by a focus gadget 401b connected to an idle conference object 403b.

Figure 24A:
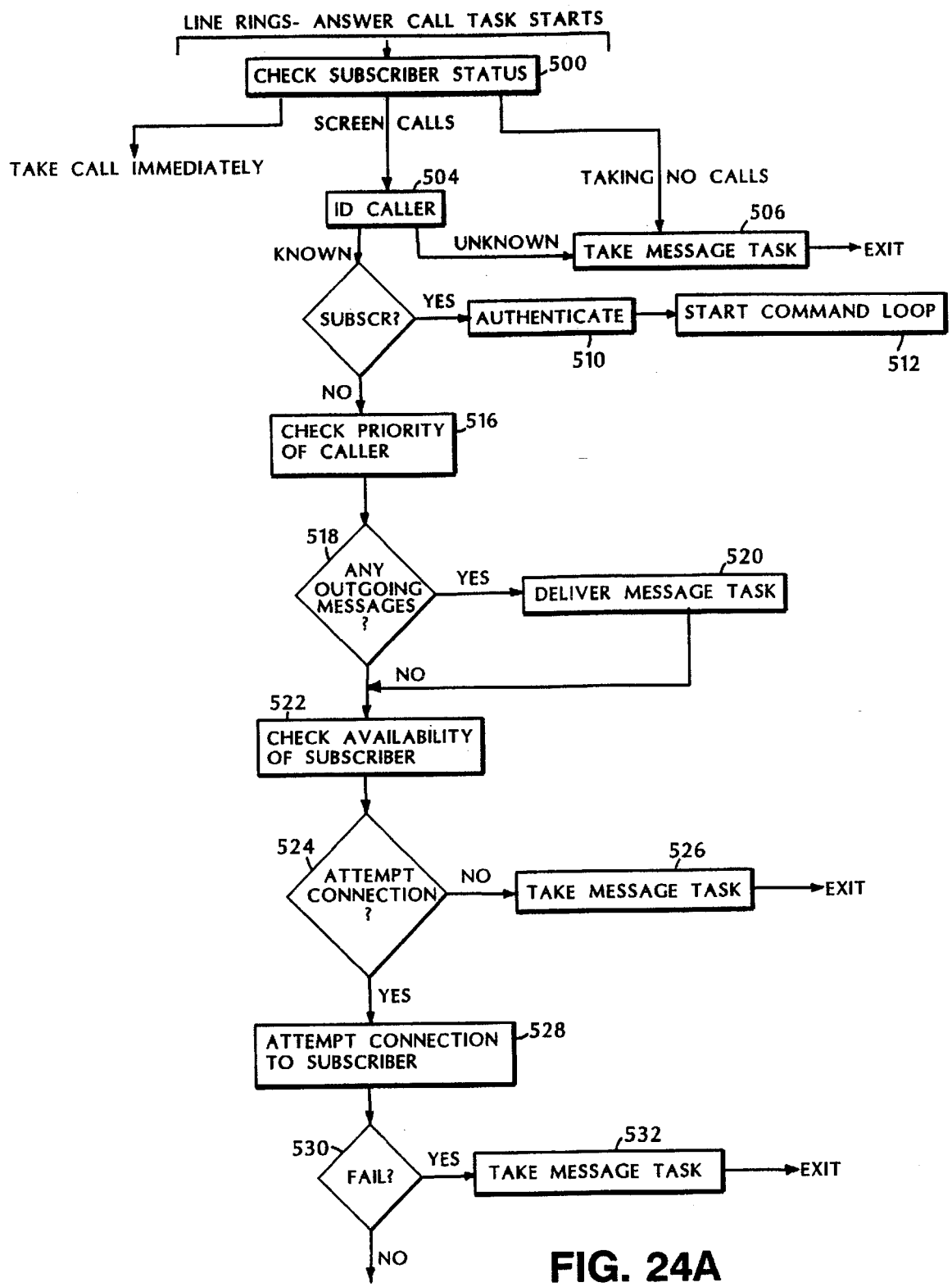
FIGS. 24A-B is a flow chart of the answer call task.

Subscriber A initiates the call by instructing his electronic assistant to establish a connection to subscriber B. In response, the VM checks whether subscriber B is in session, i.e., whether a master session is running for subscriber B. If subscriber B is in session, the VM notifies subscriber A's electronic assistant that subscriber B is in a session on the system. This information is communicated to subscriber A, who then is given the opportunity to confirms his request for a connection. When subscriber A confirms his request for a connection, his electronic assistant sends a conference request 405 to subscriber B's electronic assistant and the VM creates a conference object 407 for the requested connection (FIG. 24A).

Figure 24B:
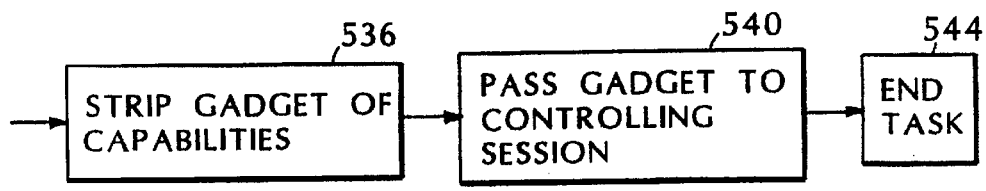
Figure 25A:
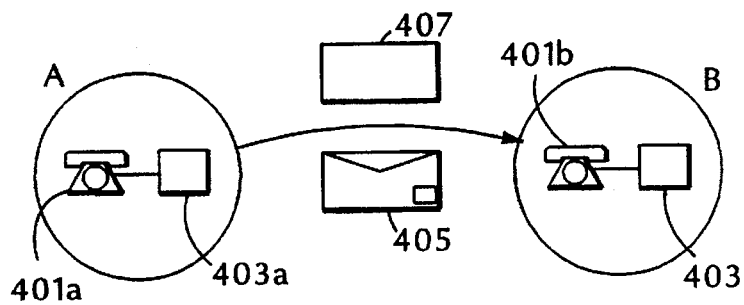
FIGS. 25A-D illustrate the use of a conference object in establishing a call between subscribers.
Figure 25B:
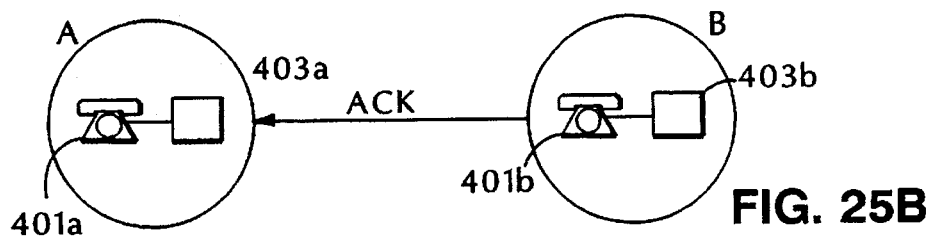
Figure 25C:
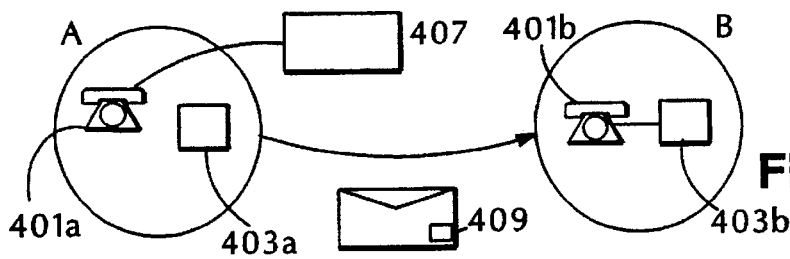
Figure 25D:
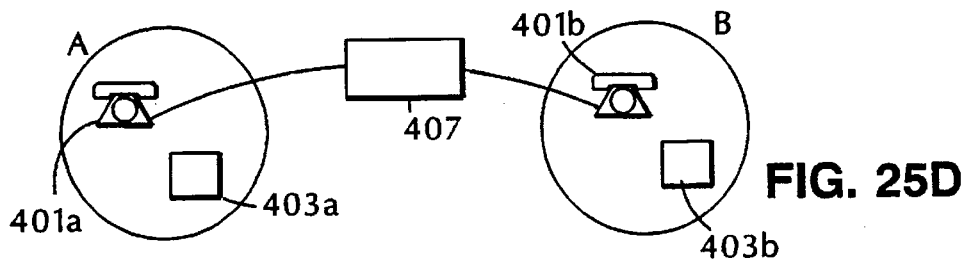

If subscriber B indicates to his electronic assistant that he will accept the requested connection, his electronic assistant sends an acknowledgment (ACK) back to the electronic assistant for subscriber A (FIG. 24B). In response to receiving the ACK from subscriber B, subscriber A's electronic assistant constructs a conference parcel 409 identifying the conference object 407 which has been created for the connection, connects itself into the conference object 407, and sends the conference parcel 409 to subscriber B's electronic assistant (FIG. 24C).

When the electronic assistant for subscriber B receives the conference parcel from subscriber A, it extracts the identity of the conference object from the parcel, removes its active gadget from its idle conference object, and adds its active gadget to the newly received conference object 407 (FIG. 24D). At this point, subscribers A and B are switched together and their electronic assistants let them know that they are connected by saying "Go ahead".

The Functionality of The Electronic Assistant

The set of commands that are accessible to the subscriber are presented in Exhibit A. The various tasks which the electronic assistant can execute implement the functionality associated with these commands.

The following are more detailed descriptions of various functions that the electronic assistant performs for its subscriber using the mechanisms described above. The functions that are described include among others: (1) handling an incoming call to a subscriber, (2) creating a contact, (3) creating a reminder, and (4) notifying the subscriber of a reminder.

Handling an Incoming Call:

First, we describe how the system handles an incoming call from a caller (i.e., Bill Bishop) to a subscriber (i.e., Jim Smith). The system's call handling functions are invoked when a caller places a call to the subscriber's phone number. The central office notifies the system of an incoming call by placing a ring signal on a T1 line into the system. The interface card that is monitoring that T1 line responds to the ring signal by picking up the line and acquiring a 4-digit sequence of DTMF identifying the extension that is being called. The interface card generates an event for the virtual machine. The virtual machine determines from the hardware what number was called and from that determines the identity of the subscriber being called.

Upon receiving an indication of an incoming call, the VM starts up a session, i.e., a single thread of execution, that will be assigned to handling that call. When the VM server spawns the session, a handshake occurs between the session and the VM server to enable the two entities to communicate with each other. As part of the handshake, the server process passes to the session an ID of the subscriber for whom the session is being started up. Thus, the session is able to immediately establish a reference to a user object in the database that contains the stored information for the subscriber.

In addition to receiving the ID of the user for which the session has been started, the VM also passes up the identity of the channel out of which it constructed an active gadget. The active gadget represents the communication path to the incoming caller. The active gadget represents the particular communications line that the call came in over, in this case a phone line. Until the capabilities are added, the active gadget simply represents a channel with no input or output capabilities. Therefore, to enable the system to play prompts, record incoming signals, and perform voice and DTMF recognition on the channel, the assistant adds capabilities to the active gadget. For example, the assistant adds interactive-out capability, interactive-in capability and recognition capability. The capabilities that are added to the active gadget map to ports which the VM attaches to the channel. For example, interactive-out capability maps to an audio-out port for playing audio, the interactive-in capability maps to audio-in port for recording speech), and the recognition capabilities map to speech recognition and DTMF ports.

Once the capabilities are set up, the electronic assistant invokes an answer call task to handle the incoming call. Referring to FIGS. 24A–B, the answer call task engages in a dialogue with the caller to collect certain information which will be necessary to beginning execution of the task. In general terms, the answer call task initially has two fields of information that must be filled in: WHO is calling and WHAT would the caller like the electronic assistant to do.

When an incoming call arrives for a given subscriber there are a number of ways in which the assistant might handle the call, depending on the preferences which the subscriber has previously selected. The assistant might directly forward the call to a telephone on the subscriber's desk phone, it might simply offer to take a message from the incoming caller, or it might attempt to locate the subscriber and offer to connect him to incoming call once he is located. In handling the call, the answer call task first checks the subscriber's status to determine which preference he has selected (step 500).

In the described embodiment, it is assumed that the caller wishes to have a connection established with the subscriber, thus the caller is not offered any options for responding to the second question. However, in alternative embodiments, the answer call task could be modified to offer the caller the option to leave a message, to specify the priority of the call, or to send a page, among other things.

Also note that if ANI (automatic number identification) is supported, the interface card could have stripped off the ANI signal that it received from the central office and supplied it to the electronic assistant for the session. If that number mapped to a contact in the subscriber's contact list, the electronic assistant could supply the "Who?" entry automatically without engaging in dialog with the caller. Even in that case, however, it may still be desirable to engage in a dialog with the caller to confirm the caller's identity.

After the answer call task determines that the subscriber wants calls screened, the answer call task attempts to identify the caller (step 504). The electronic assistant instruction passes an object (i.e., a meme object) to the active gadget instructing it to say "Please say your name." It also passes the subscriber's contact menu to the gadget so that the caller's reply can be matched against the subscriber's contacts to determine whether or not the caller is a known contact. The electronic assistant asks the gadget to return the identified name.

The gadget presents the "Please say your name" meme to the channel. The channel presents the meme to the collection of attached ports and the appropriate port plays the meme by retrieving the stored audio version from the systems database.

Upon receiving the caller's spoken response, the channel attempts to match the response against responses stored for known contacts in the contact menu. The result which is passed up to the electronic assistant will either be the identity of a known contact or an indication that its an unknown contact. If it is an unknown contact, the answer call task invokes a take a message task which offers the caller the option to leave voice mail for the subscriber (step 506). If the caller is a known contact, the electronic assistant determines whether the known contact is, in fact, the subscriber for whom the electronic assistant is acting (step 508). If the electronic assistant determines that the caller is the subscriber, the electronic assistant authenticates the subscriber by asking for a password before allowing him to have access to the system commands (step 510). Once the identity of the subscriber is verified, the electronic assistant notifies the subscriber of all new messages that have been stored since he last read them and it starts the command task which gives the subscriber access to the set of commands for controlling the electronic assistant (step 512).

If the caller is not the subscriber, the electronic assistant checks the subscriber's contact list to determine the priority of the caller (step 516). Recall that the subscriber's contact list includes the subscriber's designation of each contact's priority (i.e., normal or high). The priority indicates the importance of calls that are received from the caller.

While checking the priority of the caller, the electronic assistant also checks the data structure for the contact to determine whether there are any voice messages left for the caller by the subscriber (step 518). If there are voice messages, the electronic assistant invokes a deliver message task which asks the caller whether or not he wishes to hear the voice messages left by the subscriber (step 520).

The deliver message task performs the following sequence of events. First, the electronic assistant sends a meme to the channel instructing it to say to the caller "I have a message, would you like to receive it?". It also passes a pointer to the stored voice message in its message database. The caller responds by pressing the appropriate buttons on the DTMF phone. If the caller presses "9" for "yes", the audio-out port retrieves and plays the appropriate media representation of the stored message. After the message is played, the electronic assistant checks whether there are any other unplayed messages, and if there are, it goes through the same sequence of operations to present the other messages to the caller.

Note that the deliver-message task of the described embodiment does not perform any verification of the caller's identity. It may, however, be desirable to do so. This can easily be done by modifying the task to request a verification such as a password.

After the deliver message task is complete or if there are no voice messages for the caller, the electronic assistant checks the availability of the subscriber (step 522). The subscriber has the ability to designate his availability through the "I Will Be" command (described elsewhere). This information is stored in the database as part of the subscriber's user object.

After identifying the subscriber's availability, the electronic assistant determines whether or not to attempt to establish a connection to the subscriber (step 524). In the described embodiment, the determination is based on whether the caller has high enough priority to meet the availability criteria established by the subscriber. For example, if the caller is identified in the database as a normal priority contact and the subscriber has indicated his availability to be "taking important calls", then the electronic assistant does not attempt to establish a connection to the subscriber for this particular call. On the other hand, if the contact's priority is designated as high priority, then the electronic assistant performs the operations necessary to establish a connection with the subscriber.

The decision algorithm in the described embodiment is a very simple one. Alternative embodiments might use much more elaborate algorithms to filter the caller's request for a connection to the subscriber. For example, the decision could take into account other information about the caller such as his Job description, or the identity of the company from which he is calling. Also, it would be a simple matter to let the priority of the caller change to reflect the number of calls that the subscriber has initiated to that caller within some preselected period of time. A contact that the subscriber calls frequently would have a priority that is higher than a contact to whom the subscriber rarely places a call.

If the decision is made to not attempt a connection to the subscriber, the electronic assistant invokes a take message task (step 526). In general, the take message task reports to the caller that the subscriber is not available at that moment and asks the caller whether or not he wishes to leave voice mail for the subscriber. After the take-message task is complete, the electronic assistant performs whatever operations are necessary to disconnect from that channel and terminate the session for that caller. This includes, for example, freeing up the resources that were required to support the connection from a caller by stripping off the capabilities that are associated with the active gadget and deallocating the audio-in, audio-out, and recognition ports from the channel so that they may be used by other sessions.

If the subscriber has indicated that he is available to receive calls from that contact, the answer call task performs the steps that are necessary to establish the connection (step 528). To further illustrate the operation of parcel mechanism, the exchange of parcels that takes place to assist in establishing the connection will also be described.

The answer call task in the caller's session sends a connect parcel addressed to the subscriber. The connect parcel requests that a connection be established with the subscriber and it identifies the caller's session. The VM handles the delivery of the parcel. If the VM determines that no master session currently exists, it spawns a new session which it designates as the master session and then delivers the connect parcel to that master session.

Once the master session exists, it immediately checks whether any parcels have been delivered to it. At this point it will discover the connect parcel that was sent by the caller's session. In response to the connect parcel, the master session checks whether it has the focus gadget. If it does not, it invokes a locate-and-notify task the purpose of which is to attempt to establish a connection with the subscriber.

Figure 26:
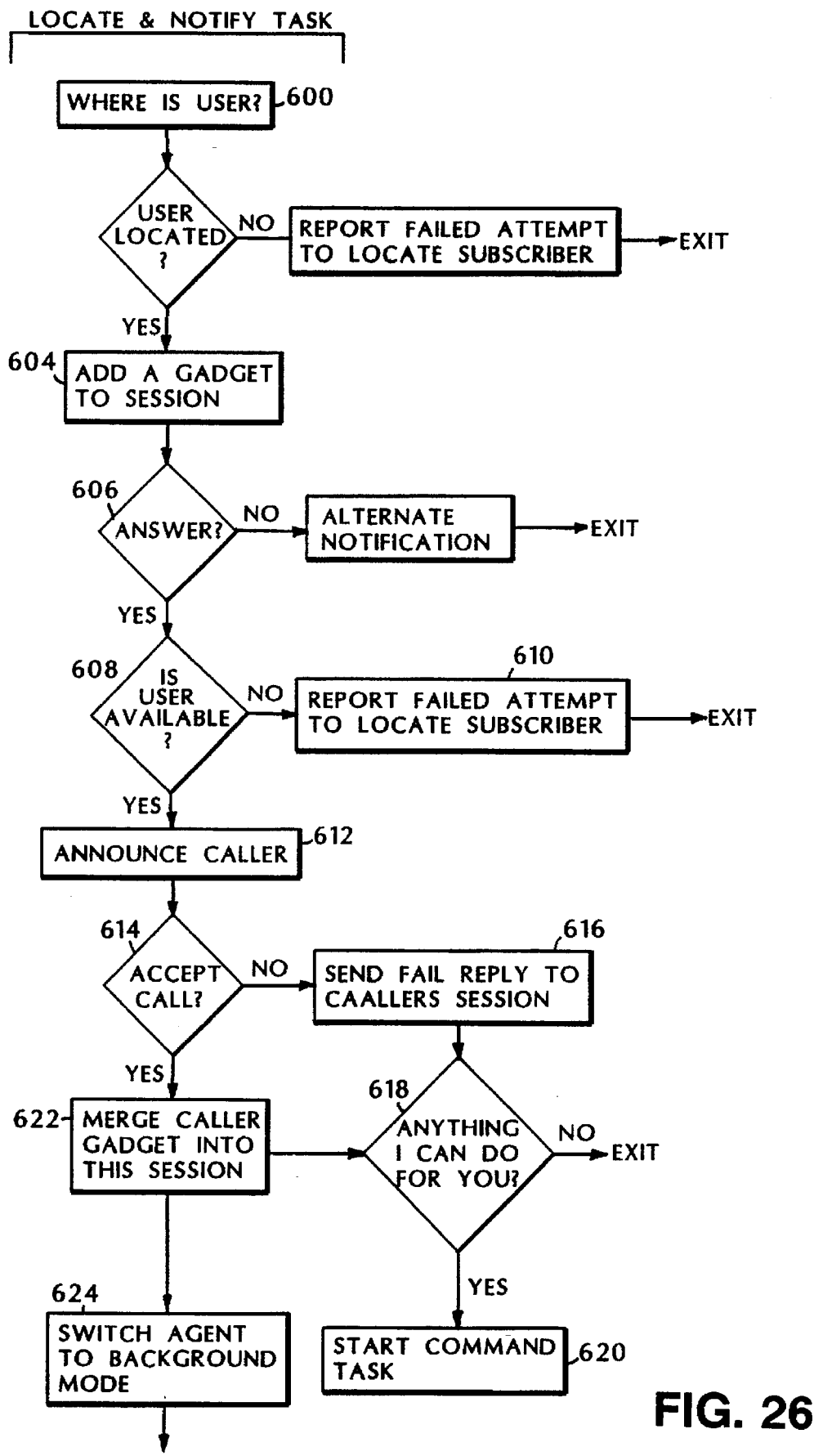
FIG. 26 is a flow chart of the locate-and-notify task.

Referring to FIG. 26, the locate-and-notify task first attempts to determine where the subscriber can be reached (step 600). In the described embodiment, the assistant checks the subscriber's user object for stored schedules. There are two schedule data structures which are used to list the schedule for a user: a default schedule and an override schedule. The default schedule indicates where the subscriber can typically be found throughout a normal day or throughout the days of a normal week. The override schedule that the subscriber can generate through the "I-Will-Be" or "Create-an-Itinerary" commands, overrides the default schedule for the relevant periods of time. For example, the subscriber may usually be in his office on Mondays and his default schedule will reflect this. However, on a particular Monday he may have to drive elsewhere to visit a client. He can generate an override schedule to reflect this change from normal routine. The override schedule would indicate that he is reachable through his mobile phone for the period of time that he is expected to be traveling by car and that he is thereafter reachable at the client's business location for another period of time.

The subscriber could also set his location as being with a second subscriber whose schedule and whereabouts are known by the electronic assistant for the second subscriber. Once this is done, the schedule of the first subscriber will track the schedule for the second subscriber who the first subscriber is with.

The locate-and-notify task checks the subscriber's override schedule to determine whether the subscriber has an override for that time. If no override exists, the electronic assistant checks the default schedule. If the default schedule identifies a location for that time, the electronic assistant can find the telephone number for that location from the information stored in the subscriber's user object. For example, if the default schedule indicates that the subscriber is scheduled to be at home at that moment, the assistant looks in the user object to find the telephone number associated with the home location, assuming of course that the subscriber has provided one.

Once the appropriate communications device and its number (or address) is identified, the electronic assistant adds a gadget representing that device to the session (step 604). If the communications device is the subscriber's home phone, the gadget that is added to the session is a phone gadget that contains the phone number for the subscriber's home phone.

In response to receiving a gadget from the master session, the VM allocates a channel to that gadget. Since the gadget is a telephone, the VM causes the appropriate interface card to allocate a phone line channel connecting to a T1 line. The VM also passes the telephone number to the interface card and the interface card dials that number. If the called number is busy, the channel reports back to the master session that the attempt to connect failed. If the phone begins ringing, the channel returns an active focus gadget to the master session. The active gadget represents an actual connection to the subscriber's home phone.

Upon receiving the active gadget, the electronic assistant immediately assigns capabilities to the active gadget to enable it to communicate through the gadget and waits for somebody to pick up the phone (step 606). If a party answers, the electronic assistant determines whether the user is available (step 608). It does this through a dialog during which the answering party can indicate whether the subscriber is there to receive the call. In the described embodiment, the electronic assistant causes the audio-out port to play the previously described stored message:

Hello, I'm trying to reach Jim Smith. If he is available, press the 9 key. If he is not available, press the 6 key or hang up.

It might be desirable to tailor the dialog to take into account the location of the phone that was just called. For example, one might wish to designate phones as being in friendly territory, questionable territory, or hostile territory. A phone that is in friendly territory might be any phone for which it is likely that the person answering it is familiar with interacting with the electronic assistant. A phone that in questionable territory might be is any phone for which there is a 50/50 chance that the answering party is not experienced in interacting with the electronic assistant. Phones in hostile territory might be any phone for which there is a reasonably high likelihood that the answering party is not experienced in interacting with the electronic assistant. By identifying the connection devices in this manner, an appropriate dialog for interacting with the answering party can be selected. For the inexperienced user, the electronic assistant might use a verbose dialog which explains how to interact with it more fully. Whereas, for the experienced user, it might use a terse dialog which assumes that the person knows how to respond without being told.

If the answering party indicates that the subscriber is not available, this is reported to the master session which then sends a reply parcel back to the caller's session indicating that the connection attempt failed (step 610). The master session then goes through the sequence of steps that is necessary to terminate the session. This includes stripping the capabilities from the active gadget.

If the answering party indicates that the subscriber is available, then the electronic assistant announces the identity of the caller to the subscriber (step 612):

There is a call from Bill Bishop. Do you want to take the call? Indicate Yes by pressing the 9 key, indicate No by pressing the 6 key.

It then asks the subscriber whether he wishes to accept the call (step 614).

If the subscriber declines the call, the locate-and-notify task sends a failed connection reply parcel back to the caller's session (step 616). In response to the fail reply, the caller's session informs the caller that the subscriber could not be found and it offers the caller the option of leaving a recorded voice message for the subscriber. If the caller accepts the message option, the electronic assistant records the caller's voice message and stores it for the subscriber to play back at some later time.

While the connection to the subscriber still exists, the locate-and-notify task asks the subscriber whether there is anything it can do for the subscriber at this time (step 618). If the subscriber responds by saying no or pressing the "6" key, the locate-and-notify task says "Goodbye" to the subscriber, sends a hang-up command to the channel, and then terminates. On the other hand, if the subscriber indicates that he wants to access his electronic assistant's commands, he must first do additional authentication, then the electronic assistant starts a command task which enables the subscriber to access those capabilities either through voice or DTMF commands (step 620). The commands identified in Exhibit A are then available to the subscriber.

If the subscriber accepts the call, the locate-and-notify task sends a connect reply parcel to the caller's session. Referring to FIG. 24B, in response to receiving the connect reply parcel, the caller's session removes from its active gadget some of the capabilities that will no longer be necessary (e.g. interactive-in, interactive-out, and recognition capabilities) (step 536) and sends the gadget to the subscriber using the parcel mechanism (step 540). Upon receiving the active gadget from the caller's session, the electronic assistant for the master session adds that active gadget to its session and connects both the active gadget and the focus gadget together thereby enabling the subscriber and the caller to communicate with each other (step 622 in FIG. 26). The interface cards perform the switching function that connects the two gadgets together by allowing each gadget to listen to the output of the other channel (i.e., by allowing each channel to have access to the appropriate time slot on the MVIP bus line that carries the other party's signal).

When the connection is established between the caller and the subscriber, the electronic assistant switches into a background mode in which it monitors the subscriber's output for a command (i.e., "Wildfire") that will call it back into its foreground mode (step 624). While the electronic assistant is in the background, it only responds to the single command which calls it back into the foreground and it ignores all of the other commands in its command set.

Recall that it was assumed in the above discussion that a master session was not running when the VM wanted to deliver the request connect parcel from the caller's session. If, however, there is a master session running, the VM delivers the parcel to that master session.

Figure 27:
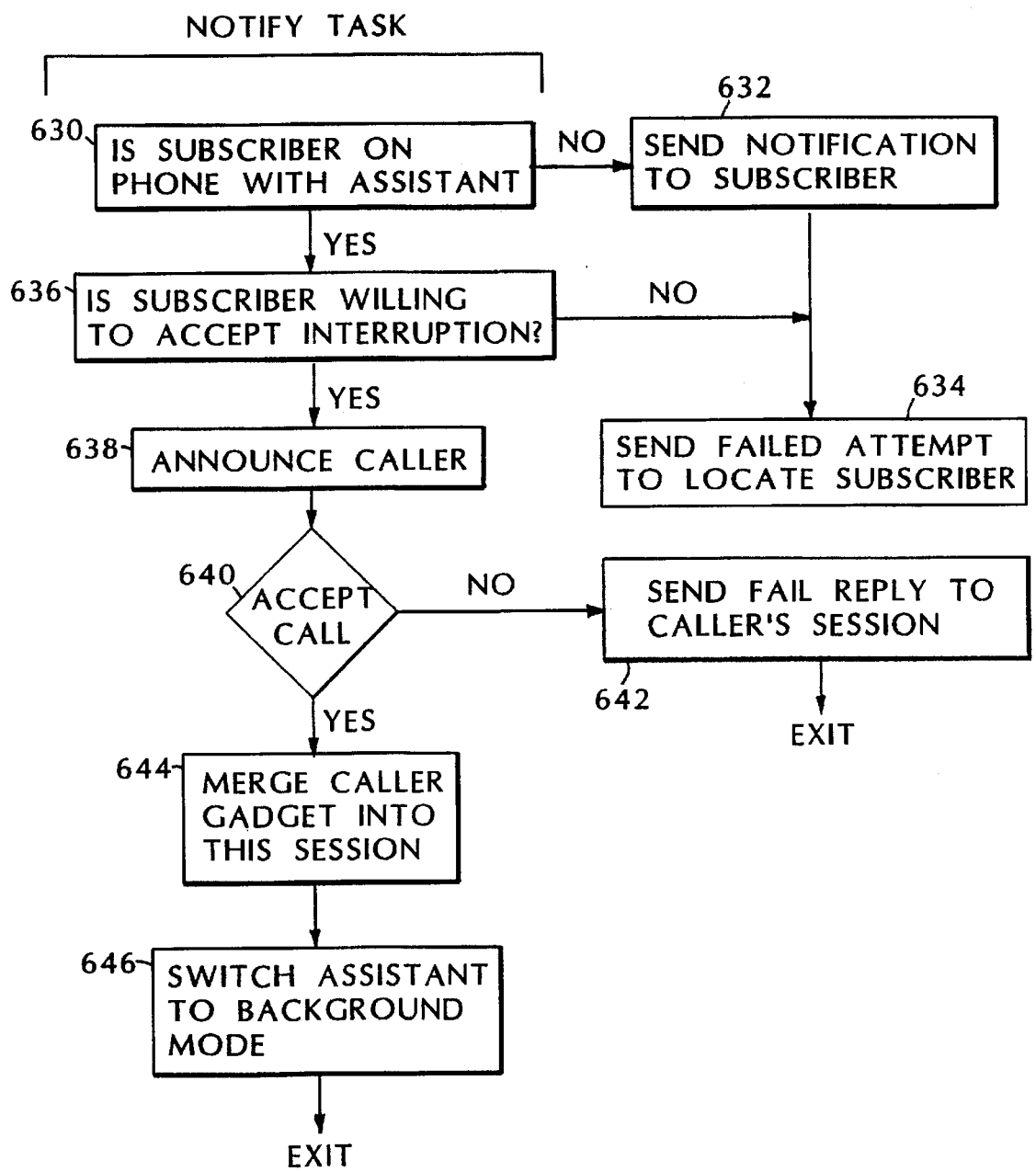
FIG. 27 is a flow chart of the notify task.

When an already existing master session receives a request to connect parcel from another caller's session, it is stored in a queue. The master session repeatedly checks this queue for received parcels. When it detects the presence of a new parcel, it acts upon it immediately. In the case of the request to connect parcel, the master session initiates a notify task (see FIG. 27). The notify task checks whether the subscriber is interacting with the master session through a phone channel (step 630). If the subscriber is interacting with the session through communication channel other than a phone channel, it sends a notification to the subscriber which identifies the caller and notifies the subscriber that he has just received a call from that individual (step 632). The master session then sends a reply to the request to connect parcel back to the caller session indicating that the attempt to connect failed (step 634).

If the caller is communicating with the master session through a phone channel, the notify task first determines whether the subscriber has indicated that he is willing to accept an interruption to his call (step 636). For example, when the subscriber connected to the call he could have used a "Hold All Calls" command to indicate his preference to not be interrupted. The "Hold All Calls" command temporarily sets the subscriber's status as unavailable during a call being handled by the master session.

If the subscriber indicated that he did not want to be interrupted, the notify task sends a non-interactive notification to the subscriber of the caller's attempt to reach him and then reports the caller's session that the connect attempt failed (step 634).

If the subscriber did not set his status to block interruptions, the notify task notifies the subscriber of the caller on hold (step 638). The system has a form of call waiting in which it first plays a short tone that can be heard by both the subscriber and the party he is talking to and then it plays the name of the incaller, using the caller's spoken self identification. The interruption is handled so as to prevent the caller with whom the subscriber might be talking at that moment from hearing the message (referred to generally as the smart call waiting feature). On some phones this is done by placing the caller on hold for a short period of time while the announcement is made. On other phones, it is possible to send the message to the earpiece on the subscriber's phone without the caller hearing it.

The electronic assistant then gives the subscriber the option to reject the call or to accept the call. Current valid commands are Take-A-Message and I'll-Take-It. If the subscriber rejects the call or does not respond within a preselected period of time, the electronic assistant sends a fail reply to the caller's session (step 642). In response to the fail reply, the caller's session may simply inform the caller that the subscriber could not be found or it may offer to take a message from the caller. If the caller accepts the message option, the electronic assistant records the caller's voice message and store it for the subscriber to play back at some later time.

If the subscriber accepts the new call, the electronic assistant merges the caller's gadget into the master session (step 644) and places the first caller on hold.

While the subscriber is connected to the new caller, if yet another call comes, the electronic assistant handles the new call in the same manner. Thus, it is possible for more than one caller to be on hold at the same time.

To switch back to the first caller, the subscriber issues a "Press-the-hold-button" command. If there is only one call waiting, the electronic assistant puts the second caller on hold and switches to the first caller. Thus, by using the "Press-the-hold-button" the subscriber can toggle back and forth between the two parties. However, if there is more than one call waiting, the electronic assistant responds to the "Press-the-hold-button" by placing the caller with whom the subscriber is presently speaking on hold and saying: "Shall I connect you with <caller's name>?" If the subscriber responds by saying "yes", the electronic assistant connects the subscriber to the identified caller. If the subscriber responds with "No", the electronic assistant again says "Shall I connect you with <next caller's name>?" In this manner, the electronic assistant proceeds cycles the group of parties that are on hold until the subscriber indicates that he wishes to establish a connection with one of the parties.

Create Contact:

Among the other commands available to the subscriber are certain non-message object creation commands. These are used to create contacts which are added to the subscribers contact list, and to create call and recorded reminders, both of which are held by the cron agent for delivery to the subscriber at the appropriate time. Through a phone conversation the subscriber invokes these commands by saying: "Create-A-Contact", Remind-Me-To-Call" and "Remind-Me". An example dialogue which results from invoking the "Create-A-Contact" command is shown in FIG. 28. The mechanisms for implementing this dialog through the channel (and other dialogues which are described below) are the same as were described earlier and will not be repeated in the following discussions.

In response to receiving a "Create-A-Contact" command, the electronic assistant asks the subscriber "What kind— person, place or group?". The subscriber responds by identifying one of these types. In the illustrated dialogue of FIG. 28, the subscriber responds by saying "Person". The electronic assistant then asks for the person's name. Since the electronic assistant will use the subscriber's vocalization of the contact's name, it asks the subscriber to repeat the contact's name a second time to improve the quality of the stored vocalization.

After the subscriber has identified the contact's name, the electronic assistant requires the subscriber to add a phone number by asking: "Which phone number?". In response, the subscriber can identify home, work, mobile or other. In the illustrated example, the subscriber responds by saying "Work". The electronic assistant then asks for the phone number and the subscriber enters the number followed by a # key. The electronic assistant acknowledges receipt of the number by saying "Got it. Now what?"

If the subscriber wants to enter additional information for that contact, he uses the "Update-It" command. The electronic assistant responds by asking "What?". To this the subscriber responds by identifying the particular item of information which he wishes to add or update. If the subscriber says "Priority", the electronic assistant asks "Normal or high". After the subscriber selects one of the available priorities, the electronic assistant indicates it is ready for another command by saying "Got it". If the subscriber wishes to add or modify further information for that contact, he again uses the "Update-It" command followed by an indication of what information is to be added or changed. In the illustrated example, the next item selected for update by the subscriber is the spelling of the contact's name. In response, the electronic assistant notifies subscriber that it is ready to accept the new information by saying "Begin spelling now".

After the spelling has been entered, the electronic assistant indicates its readiness for the next command from the subscriber. If no command is forthcoming within a predetermined period of time, the electronic assistant prompts the subscriber for a command. If the subscriber indicates that he has no further additions or changes at this time, the electronic assistant indicates that the "Create-A-Contact" is over by saying the "Done".

The subscriber can also create new contacts by copying them from the phone book. Phone book entries, however, do not have voice identifications associated with them. Thus, if the subscriber copies an entry from the phone book, he must add a voice identification to make it part of his contact list.

Finally, a contact can be created as a result of receiving a message with an enclosed contact. When reviewing a message which contains a contact, the assistant asks the subscriber if he wishes to transfer the contact out of the message and into the subscriber's contact list. If the subscriber responds by saying "yes", then an procedure that is similar to the one for saving phone book listings is executed.

It should be noted that the system is capable of capturing phone numbers under other circumstances and later use this captured information to assist the subscriber. For example, when the assistant responds to a call and offers the caller the option of leaving a message for the subscriber, it first asks the caller to enter his phone number. After the phone number has been entered, the electronic assistant then records the caller's voice message. Also when the subscriber dials another number through the electronic assistant, that dialed phone number is remembered. This remembered information can later be used in response to a "Give-Them-A-Call" command or to create a contact for the person or place that is represented by the remembered phone number.

Remind-me

As indicated above, the subscriber can use the commands "Remind-Me" and "Remind-Me-To-Call" to create reminders. The dialogs associated with these tasks are shown in FIGS. 29 and 30, respectively.

To create a reminder, the subscriber issues the "Remind-Me" command. This causes the assistant to invoke the reminder task with an attribute to indicate the creation of a recorded reminder. At this point the assistant prompts for what the user would like to be reminded about. At that point it starts recording as a message whatever the subscriber says into the phone, to be played when the reminder comes due. The subscriber indicates the end of the message by pressing the "#" key and the electronic assistant stores the recorded message in its database.

After the recording is complete, the electronic assistant engages in further dialogue with the subscriber to establish a time at which the reminder is to be delivered. The electronic assistant asks "When?". The subscriber responds using one of several conventions that are available in the system for specifying a time. The conventions are shown in Table III. In the described example, the presenter responds by saying "Today". The electronic assistant then asks the subscriber for a time. Using DTMF signals DTMF, the subscriber enters a specific time (e.g. 530 for 5:30). The electronic assistant responds by restating the time which the subscriber has entered and asks for a confirmation from the subscriber. If the subscriber confirms the time, the electronic assistant indicates that the dialogue has concluded successfully by saying "Got it, I'll set my watch alarm.". If the subscriber does not confirm the time (either because the electronic assistant made a recognition error or because he changed his mind), the electronic assistant then repeats the above described sequence of operations to obtain a new time.

If the subscriber issues the "Remind-me-to-call" command (see FIG. 30), the create-reminder task asks the subscriber "Call whom?". The subscriber's response "John Smith" is recognized by the voice recognition capabilities of the ASR card and matched against utterances stored with the subscriber's contact list that identify the subscriber's contacts. If a match is found (i.e., if a contact from the subscriber's contact list is identified), a pointer to that contact is saved as part of this call reminder.

The electronic assistant then engages in the previously described dialogue with the subscriber to obtain a delivery time for the reminder. After the delivery time has been entered, the electronic assistant asks the subscriber: "Should I know the topic for the call?". If the subscriber responds in the affirmative, the electronic assistant says "Recording..." to notify the subscriber that he may begin recording. As before, the subscriber ends the recording by pressing the # key. In response, the electronic assistant confirms that the command has been received by saying "Got it, I'll set my watch alarm".

The electronic assistant sends the completed reminder to the Cron agent via the parcel mechanism. First, it packages the reminder in a parcel that is addressed to the subscriber and includes its desired delivery time. It then places that parcel in a second parcel that is addressed to the Cron agent. The VM delivers the outer parcel to the Cron agent. Upon receipt, the Cron agent opens the parcel and pulls out the parcel that is inside; it checks the delivery time for that parcel and places it in a time ordered queue. The Cron agent keeps track of the delivery time of the top parcel.

Handle Reminder Task:

At the delivery time, the Cron agent wakes up and sends the reminder parcel to the indicated address. As described earlier, the VM handles the delivery of the reminder parcel. If there is no master session running, the VM starts up a session and delivers the parcel to that new session. If there is a master session running, the VM delivers the parcel to the master session.

Figure 31:
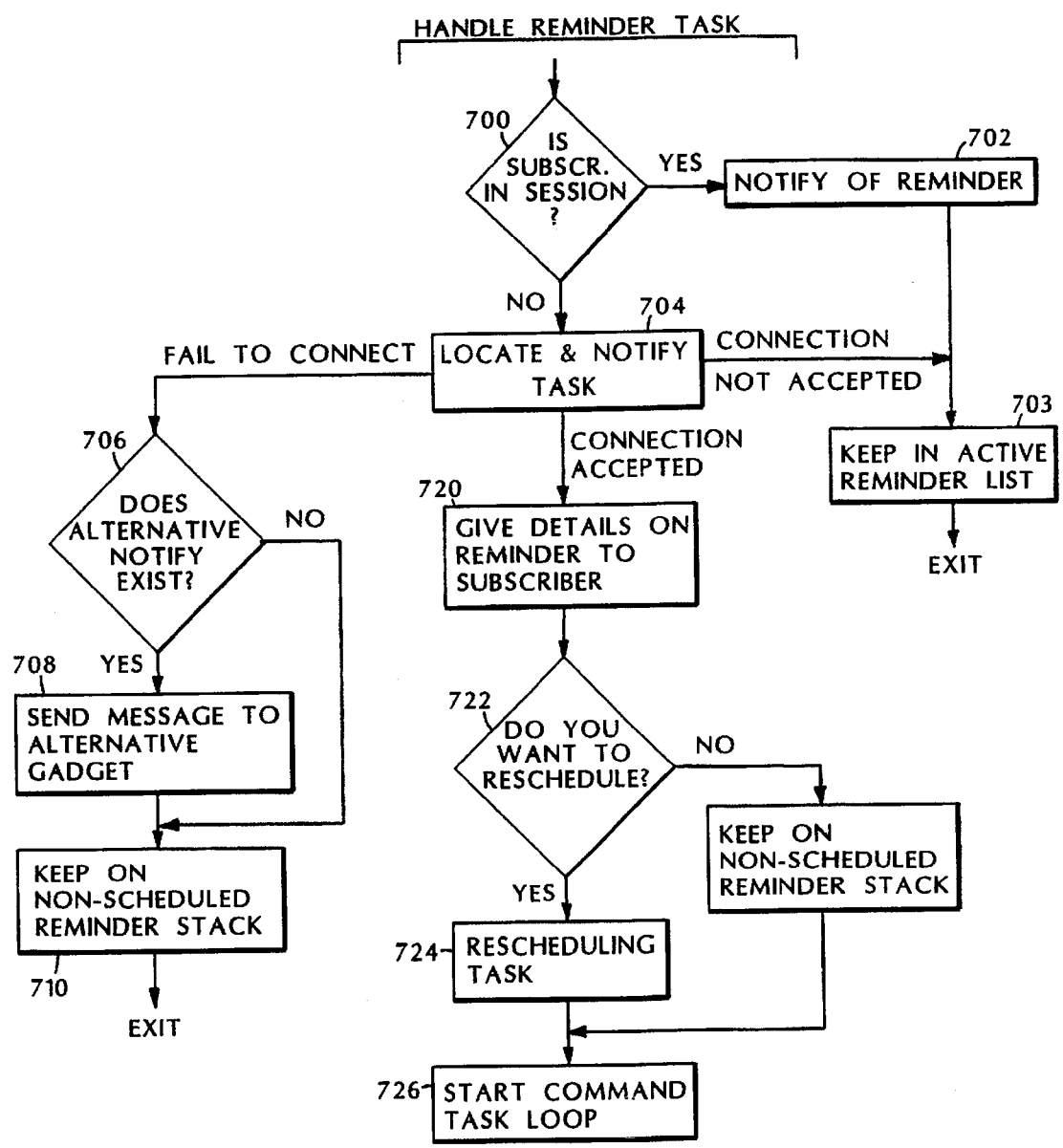
FIG. 31 is a flow chart of the handle reminder task.

Referring to FIG. 31, when the session that receives the parcel detects that it has received a reminder parcel, it starts up a handle reminder task. The handle reminder task checks whether the current session is a master session (i.e. whether the session has the focus gadget) (step 700). If the session is communicating with the subscriber, the electronic assistant notifies the subscriber of the reminder using the existing focus gadget (step 702). The method used for notifying the subscriber depends upon the channel through which the subscriber is connected to the session. If the subscriber is connected through a phone channel, the electronic assistant briefly interrupts his call, reports to him that a reminder has come due. After notifying the subscriber of the reminder, the electronic assistant places the reminder in an active reminder list in the box, where the subscriber can review it during the current or any subsequent sessions (step 703). The user can then invoke a "Find-Active-Reminders" command to deal with the recently received reminder.

If the subscriber is not connected to the session, the handle reminder task initiates a locate-and-notify task. The locate-and-notify task operates in the manner previously described except that instead of notifying the subscriber of a caller's attempt to reach him, it notifies the subscriber of the reminder. If the locate-and-notify task is unable to establish a connection with the subscriber, it sends a failed-to-connect reply to the handle reminder task. In response, the handle reminder task checks whether the subscriber can be reached through a non-interactive means by, for example, checking for a pager assigned to the subscriber. If no alternative means for notifying the subscriber exists, the electronic assistant places the reminder on the non-scheduled reminder stack (step 710). If an alternative means for notifying the subscriber does exist, the electronic assistant sends a notification to the alternative gadget (step 708) before placing it on the non-scheduled reminder stack.

If the locate-and-notify task establishes a connection with the subscriber, the reminder is played back to the subscriber (step 720). After that, the electronic assistant asks the subscriber if he wants to reschedule the reminder (step 722). If he elects to reschedule it, a rescheduling task is executed that enables the subscriber to change the delivery time for the reminder (step 724). The modified reminder is then sent back to the cron agent for delivery at the rescheduled time. The handle reminder task then starts the command task loop running which enables the subscriber to access the full set of commands (step 726). Additionally, at any time during a session, a subscriber can "Find" and reschedule pending reminders using the "Update-it" task. (See Exhibit A).

If the subscriber elects not to reschedule the reminder, the reminder is placed on a non-scheduled reminder stack (step 725) and the handle reminder task starts up the command task loop (step 724). If the call reminder identifies a contact, the subscriber can use the "Call Them" command at this point. Since the call reminder includes a pointer to the contact in the subscriber's contact list, the electronic assistant interprets the "Give-Them-A-Call" command as though it was equivalent to a "Call" command where the contact is the one in hand. The electronic assistant uses the gadget identified in the contact's object to place the call.

If the locate-and-notify task reaches the subscriber's gadget but the connection to the subscriber is not accepted, the electronic assistant places the reminder in the active reminder stack (step 703).

Other tasks that are implemented by the system are best described through examples of the commands and the dialogs that the system supports when interacting with the subscriber. A summary of the commands is presented in Exhibit A at the end of this specification.

Find Command:

Referring to FIG. 32, the subscriber can retrieve and review access various items of information that are stored for him by using the Find command. When the subscriber says "Find" while the electronic assistant is running the command task loop, the electronic assistant replies by asking "Find what?". At this point the subscriber can identify one of seven different items, namely, contact, all-the-contacts, phonebook-listings, messages, new messages, messages from, saved messages, reminders, and trash. The operation of the Find command will be illustrated using the contacts as the item which the subscriber wishes to manipulate.

When the subscriber is asked for what it is that he wants to find, he replies by stating "All-The-Contacts". The electronic assistant then accesses the subscriber's contact list and reports to the subscriber how many contacts are on the list. Then the electronic assistant waits for a command from the subscriber. The subscriber can search the contact list for a given name by issuing the Find "Contact" command. In response, the electronic assistant asks "Contact name?". The subscriber responds with a name, e.g. John Smith. The electronic assistant acknowledges by replying "Contact name, John Smith" to indicate it has the user object for that contact in its hand. The subscriber can then instruct the electronic assistant to: (1) describe it by issuing the describe command; (2) update it by issuing update command; (3) discard it by issuing the "Throw-It-Away" command; or (4) call them using the "Give-Them-A-Call" command.

If the subscriber issues the describe command, the electronic assistant replies by reporting to the subscriber the information that is stored for that contact.

If the subscriber issues the update command, the electronic assistant initiates a dialog similar to that previously described with the Create command which enables the subscriber to modify or add to the information stored for that contact.

The subscriber can instruct the electronic assistant to dial a number by saying "Call" which causes the electronic assistant to invoke the call task. The call task asks the subscriber to provide the number, which may be provided either as a reference to a contact, by entering a specific number or by saying "this-one", referring to a contact message or call reminder being pointed to; then, it dials the number. As soon as the ringing begins, the electronic assistant establishes a connection is between the subscriber's line and the outgoing call line so that the subscriber can complete the call. When that connection is made, the electronic assistant automatically switches into its background mode in which it will only respond to a particular command (e.g. "Wildfire") which causes it to switch back into the foreground. In its background mode, the electronic assistant disables its full command set so that the utterance of the command words during the course of the conversation will not unintentionally invoke a command task.

Anytime the electronic assistant is running its command task which give the subscriber full access to its command set, the subscriber can instruct the electronic assistant to go into its background mode. He does this by saying the "That will be all for now". In response the electronic assistant replies, "Say Wildfire when you need me" and switches into its background mode. When the subscriber needs to access the full command set of the electronic assistant, he says "Wildfire". In response the electronic assistant moves back into its foreground mode and replies "Here I am", confirming that the electronic assistant is again fully active and that the subscriber may now access the full set of commands that are supported by the electronic assistant.

Generating an Override Schedule:

As indicated above, the "I-Will-Be" and "Create-An-Itinerary" commands enable the subscriber to generate an override schedule. A typical dialog for each of these commands is shown in FIGS. 33 and 34, respectively. The dialog for each of these commands is very similar. The "I-Will-Be" command is used for generating a single modification to the subscriber's schedule; the "Create-An-Itinerary" comand is used for generating more complex override schedules.

When the subscriber utters "I-Will-Be", the electronic assistant responds by asking "Doing What?" In the described embodiment, the subscriber may respond in one of the four following ways:

Taking Calls
Only Taking Important Calls
Unavailable
Running on Schedule

"Taking Calls" indicates to the electronic assistant that all calls should be forwarded to the subscriber; "Only Taking Important Calls" indicates that only calls from contacts that are designated as high priority should be forwarded; "Unavailable" indicates that no calls should be forwarded; and "Running on Schedule" indicates that the override schedule is being cancelled in favor of the default schedule.

In the illustrated example, the subscriber reponds by saying "Taking Calls." Next, the electronic assistant asks "Where?" To this the subscriber may respond with one of the following designations: work, home, car, mobile or other, for each of which it is assumed that a corresponding address or phone number exists.

After the subscriber has indicated how he will be reachable, the electronic assistant prompts him to indicate for how many hours to which the subscriber responds with a number. After the subscriber has indicated the time, the electronic assistant acknowledges his response by saying "Done".

The "Create-An-Itinerary" command, a sample dialog of which is shown in FIG. 34, operates in a similar manner except that it allows the subscriber to use voice commands to build as large a override schedule as is desired. In other words, after the first entry has been completed, the electronic assistant asks "And then you'll be". In response the subscriber can enter more schedule information or can terminate the command routine by saying "Back on schedule."

Calling Commands:

A subscriber can ask his electronic assistant to place a phone call in one of three ways. If the party to be called is a known contact, the subscriber can identify the contact's name and the electronic assistant will obtain the information necessary to place the call from the subscriber's contact list. If the party is not a known contact, the subscriber can identify the party and provide, either by voice or by DTMF, a phone number to call. The third way is by relying on information available from context. That is, if the electronic assistant has just retrieved a voice mail message for the subscriber, the subscriber can say "Give-Them-A-Call" and the electronic assistant will call the party that left the voice mail message. Additionally you could say "Call" "This-One". This is possible because the stored message identifies the caller either as a contact or by a telephone that the caller was asked to leave.

The stored objects for the contacts also include a pointer to a note (e.g. a voice message) which the subscriber can generate and attach to the object. When the subscriber instructs his electronic assistant to call the contact, the electronic assistant plays the stored message to the subscriber while it is attempting to establish the connection with the contact. The note might include information about the contact which the subscriber wishes to be reminded of whenever he calls that contact. For example, he may wish to know the name of contact's secretary so that he can address her by name if she answers the phone.

Request Connection:

It is possible for a subscriber to infer to his assistant that he would like to talk with another subscriber without actually placing a call to her. This is referred to as requesting a connection with another user. One mechanism for accomplishing this is for the subscriber to explicitly request a connection. This causes the subscriber's assistant to inform the electronic assistant to whom the request is being made that a connection at some point is desired. When this request is received, the receiving assistant holds onto the request until it is communicating with its subscriber. During the next session with the subscriber, the receiving assistant informs its subscriber of the requested connection and the availability of the party requesting the connection. The subscriber can then decide to connect with the other party or ignore the request.

Feature Phone:

The feature phone is an object within the system that builds smart-phone like functionality on top of the conference object. The feature phone allows the user to manage multiple calls. The user can request that their assistant place different callers on hold, hang up on certain callers, and place calls to other contacts through the feature phone. When a subscriber receives a call using the system's smart call-waiting, the call is managed by the feature phone. Current implemented functionality includes the user commands: call, hang-up, and press-the-hold button. These commands are used to manipulate an unlimited number of simultaneous calls.

Virtual Hallway:

As indicated above, the subscriber can ask his electronic assistant what is in the virtual office, what it is holding in its hand or pointing to, what is in the "trash", what new messages have come in, etc. However, a concept of a virtual hallway is also supported in the described embodiment. The virtual hallway is made up of the collection of virtual offices. The subscriber can ask his electronic assistant what other subscribers are presently communicating with their electronic assistants by using a "Who-Else-Is-Around" command. This feature can be "filtered" so that the subscriber will only see people who are in the subscriber's contact list, or who are members of certain specified groups, or who are part of a particular phone book.

In the described embodiment, which supports internal switching, and given that the virtual hallway feature enables the subscriber to see other subscribers who are on the system, the system also offers the capability to connect and share information between distributed or travelling groups or subscribers more quickly than is possible by messaging. In addition, "visibility" in the hallway can also include the ability to see what the other person is doing (e.g. on the phone, reading a message, etc.). Depending upon what the subscriber has told her assistant about her availability and accessibility, the electronic assistant will control how visible the subscriber is (or how visible she will be) in the virtual hallway.

Implemented Assistants

The described embodiment implements two types of assistants, namely, the electronic assistant described above and a reception assistant. The reception assistant is much simpler than the electronic assistant, its job is to answer a central phone number (for all of the subscribers on a particular system) and route the call to the assistant for a specific subscriber. This avoids using the DID line and allows one number to handle a large number of subscribers. The basic operation of this assistant is to ask for the extension of the subscriber being dialed and then start up that subscriber's assistant to handle the rest of the call. At this point the call can be handled in a similar manner to the answer call task previously described. In the described embodiment, it is assumed that only subscribers (not their contacts) use the reception assistant. As such, once the extension for the subscriber is entered the subscribers assistant immediately asks for the subscriber's passcode. Since the assistant can assume it is the subscriber it does not need to ask for the name of the person calling, as previously described.

It is possible to also include electronic assistants with different "personalities", i.e., assistants whose functionality is tailored to the particular subscriber for whom that assistant will be providing services. For example, there could be an electronic assistant for customer service representatives. That electronic assistant would implement a set of commands and tasks that are more appropriate to the role of a customer service representative or even a group of customer service representatives. It might handle an incoming call by asking the caller a sequence of questions designed to gather information relating to the particular customer service problem. That information might be used by the electronic assistant to determine the most appropriate person to receive the call and it might also be used to assist the customer representative in responding to the customers concerns by retrieving relevant stored data from a database. The electronic assistant might place the caller in a queue with other callers having customer service questions and then connect them as resources become available.

In addition to "customizing" the personality and skills of a subscriber's electronic assistant other specialized electronic assistants can be added to the system. For instance, a system may have, or be able to connect with, a stockbroker assistant to check on particular investments.

Other embodiments are within the following claims.

APPENDIX A

| | | |
|---|---|---|
| Call 225 | It's me, Wildfire * | Manipulating data in hand |
| - Phone Number 768 | I will be 492 | - Describe it 3481 |
| Create a contact 222 | - Taking calls 822 | - File it 3482 |
| - Person 737 | - Only taking important calls 684 | - First item 3483 |
| - Place 752 | - Running on schedule 767 | - Give them a call 482 |
| - Group 476 | - Unavailable 862 | - Next item 648 |
| - Update it 848 | Nevermind * | - Previous item 7481 |
| Do me a favor 362 | Remind me 763 | - Send a copy 722 |
| - Change the prompts 287 | Remind me to call 768 | - Throw it away 842 |
| - Train vocabulary 886 | Send a message 726 | - Go back 422 |
| Find 346 | - Send it 7482 | - Update it 848 |
| - Contact 266 | Send a page 7271 | - What are you holding? 929 |
| - All the contacts 282 | Send a reply 7272 | - Where were we? 999 |
| - New messages 6631 | Tell me 863 | Managing incoming calls |
| - Messages 6371 | - Where do you think I am 9391 | - I'll take it 4 |
| - New Messages from 6632 | - Who's on hold? 946 | - Take a message 8 |
| - Messages from 6372 | - Who else is around? 934 | - Wildfire 945 |
| - Filed messages 363 | That'll be all for now 892 | Press the hold button 7841 |
| - Phone book listing 725 | What are my options? 0 | Hang up 487 |
| - Reminders 736 | What's it say? 934 | |
| - Tutorials 888 | Wildfire 945 | |
| Good-Bye Wildfire 429 | | |

What is claimed is:

1. A method implemented by a computer-based electronic assistant to receive and manage incoming calls to a subscriber, said method comprising:

receiving an incoming call to the subscriber from a caller;

in response to receiving the incoming call, establishing a first connection between the electronic assistant and the caller, said electronic assistant being in a foreground mode;

establishing a second connection between the electronic assistant and the subscriber;

over the second connection, electronically notifying the subscriber of the incoming call;

in response to receiving a call accept command from the subscriber over the second connection, linking the caller and the subscriber so that they may communicate with each other;

upon linking the subscriber to the caller, switching the electronic assistant to a background mode in which said electronic assistant continues to monitor the subscriber over the second connection while the subscriber is linked with the caller; and in response to receiving a summoning command, switching the electronic assistant into said foreground mode, wherein the electronic assistant when in the background mode responds to a first set of commands including at least the summoning command and when in the foreground mode responds to a second set of commands, said second set of commands being larger in number than said first set of commands.

2. The method of claim 1 wherein said second set of commands includes a command that causes the electronic assistant to terminate the first connection which command is unavailable in the first set of commands.

3. The method of claim 1 wherein said second set of commands includes a command that causes the electronic assistant to establish a connection between the subscriber and another party which command is unavailable in the first set of commands.

4. The method of claim 1 wherein said second set of commands includes a command that causes the electronic assistant to send a message to another party which command is unavailable in the first set of commands.

* * * * *